(12) United States Patent
Kaita et al.

(10) Patent No.: US 10,096,992 B2
(45) Date of Patent: Oct. 9, 2018

(54) ELECTRICAL STORAGE SYSTEM

(71) Applicants: Keiji Kaita, Miyoshi (JP); Yuji Nishi, Nagoya (JP); Yukinari Tanabe, Nagoya (JP); Hiromasa Tanaka, Okazaki (JP); Motoi Ito, Nagoya (JP)

(72) Inventors: Keiji Kaita, Miyoshi (JP); Yuji Nishi, Nagoya (JP); Yukinari Tanabe, Nagoya (JP); Hiromasa Tanaka, Okazaki (JP); Motoi Ito, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 531 days.

(21) Appl. No.: 14/431,601

(22) PCT Filed: Nov. 29, 2013

(86) PCT No.: PCT/IB2013/002667
§ 371 (c)(1),
(2) Date: Mar. 26, 2015

(87) PCT Pub. No.: WO2014/087214
PCT Pub. Date: Jun. 12, 2014

(65) Prior Publication Data
US 2015/0255979 A1    Sep. 10, 2015

(30) Foreign Application Priority Data
Dec. 3, 2012 (JP) ................. 2012-264009

(51) Int. Cl.
*H02J 7/00* (2006.01)
*H02H 7/18* (2006.01)
*B60L 3/04* (2006.01)

(52) U.S. Cl.
CPC ............. *H02H 7/18* (2013.01); *B60L 3/04* (2013.01); *B60L 2240/547* (2013.01);
(Continued)

(58) Field of Classification Search
USPC ............................ 361/86–87; 320/134, 136
See application file for complete search history.

(56) References Cited

U.S. PATENT DOCUMENTS

| | | |
|---|---|---|
| 5,321,389 A | 6/1994 | Meister |
| 5,804,944 A | 9/1998 | Alberkrack et al. |

(Continued)

FOREIGN PATENT DOCUMENTS

| | | |
|---|---|---|
| CN | 101008094 A | 8/2007 |
| CN | 101197507 A | 6/2008 |

(Continued)

OTHER PUBLICATIONS

Communication dated Feb. 27, 2017 from U.S. Patent & Trademark Office in counterpart U.S. Appl. No. 14/649,014.

(Continued)

*Primary Examiner* — Danny Nguyen
(74) *Attorney, Agent, or Firm* — Sughrue Mion, PLLC

(57) ABSTRACT

An electrical storage system includes an electrical storage device (10); a relay (SMR-B, SMR-G, SMR-P) switching between on/off states; a current interruption circuit (60) interrupting energization of the electrical storage device by causing the relay to switch from the on state to the off state; and a controller (30) executing drive control over the relay. The current interruption circuit includes an alarm circuit (63) outputting an alarm signal indicating overcharging/overdischarging of any one electrical storage block by comparing a voltage value of each electrical storage block with a threshold; a latch circuit (64) retaining the alarm signal; and a transistor (68) causing the relay to switch from the on state to the off state upon reception of an output signal of the latch circuit. The controller determines an energization state of the electrical storage device by executing (Continued)

control for turning on the relay while control for causing the alarm circuit to output the alarm signal is being executed.

12 Claims, 20 Drawing Sheets

(52) U.S. Cl.
CPC .......... *H02J 7/0021* (2013.01); *H02J 7/0031* (2013.01); *H02J 2007/0037* (2013.01); *Y02T 10/7055* (2013.01)

(56) References Cited

U.S. PATENT DOCUMENTS

| | | | |
|---|---|---|---|
| 5,986,865 A | 11/1999 | Umeki et al. | |
| 8,248,030 B2 * | 8/2012 | Doepke .............. | G01R 31/3658 320/134 |
| 8,924,059 B2 | 12/2014 | Yoshikawa et al. | |
| 9,577,458 B2 | 2/2017 | Kaita et al. | |
| 2006/0103351 A1 | 5/2006 | Tanigawa et al. | |
| 2010/0001651 A1 | 1/2010 | Lin | |
| 2010/0082198 A1 | 4/2010 | Arai et al. | |
| 2010/0123434 A1 | 5/2010 | Iwata | |
| 2011/0140669 A1 | 6/2011 | Murakami et al. | |
| 2011/0149454 A1 | 6/2011 | Shibuya et al. | |
| 2012/0038325 A1 | 2/2012 | Morita et al. | |
| 2012/0069481 A1 | 3/2012 | Yamada | |
| 2013/0116875 A1 | 5/2013 | Oh et al. | |
| 2013/0141828 A1 | 6/2013 | Yamaguchi et al. | |
| 2013/0241480 A1 | 9/2013 | Kirimoto et al. | |
| 2013/0335095 A1 | 12/2013 | Kiuchi | |
| 2014/0015454 A1 | 1/2014 | Kunimitsu et al. | |
| 2015/0229143 A1 | 8/2015 | Kaita et al. | |
| 2015/0229154 A1 | 8/2015 | Kaita et al. | |
| 2015/0357856 A1 | 12/2015 | Tanabe et al. | |

FOREIGN PATENT DOCUMENTS

| | | |
|---|---|---|
| CN | 101620829 A | 1/2010 |
| CN | 102012475 A | 4/2011 |
| CN | 102436281 A | 5/2012 |
| EP | 1533881 A2 | 5/2005 |
| JP | 1-127983 A | 5/1989 |
| JP | 5-133986 A | 5/1993 |
| JP | 7-105986 A | 4/1995 |
| JP | 9-331629 A | 12/1997 |
| JP | 1012282 A | 1/1998 |
| JP | 11-155237 A | 6/1999 |
| JP | 11215716 A | 8/1999 |
| JP | 2000166108 A | 6/2000 |
| JP | 2000-312439 A | 11/2000 |
| JP | 2001-136666 A | 5/2001 |
| JP | 2001-524300 A | 11/2001 |
| JP | 2005-245049 A | 9/2005 |
| JP | 3780977 B2 | 3/2006 |
| JP | 2008199761 A | 8/2008 |
| JP | 2008312396 A | 12/2008 |
| JP | 2009-178014 A | 8/2009 |
| JP | 2009-219215 A | 9/2009 |
| JP | 2010110156 A | 5/2010 |
| JP | 2011-076778 A | 4/2011 |
| JP | 2012-50258 A | 3/2012 |
| JP | 2012065447 A | 3/2012 |
| KR | 1998-046978 A | 9/1998 |
| KR | 1999-0032282 U | 7/1999 |
| KR | 2002-0087190 A | 11/2002 |
| KR | 2003-0039579 A | 5/2003 |
| KR | 20-0439685 Y1 | 4/2008 |
| KR | 10-2012-0024738 A | 3/2012 |
| TW | 411646 B | 11/2000 |
| WO | 98/45924 A2 | 10/1998 |
| WO | 2012/005554 A2 | 1/2012 |
| WO | 2012/132178 A1 | 10/2012 |
| WO | 2012/132220 A1 | 10/2012 |

OTHER PUBLICATIONS

Communication dated Jun. 19, 2017 from the United States Patent and Trademark Office in counterpart U.S. Appl. No. 14/649,014.
Communication dated Jun. 30, 2017 from the United States Patent and Trademark Office in counterpart U.S. Appl. No. 14/424,250.
An Office Action dated Jan. 12, 2017, which issued during the prosecution of U.S. Appl. No. 14/424,250.
Advisory Action dated Oct. 23, 2017 from the United States Patent and Trademark Office in U.S. Appl. No. 14/424,250.
Notice of Allowability dated Mar. 15, 2018 from U.S. Patent & Trademark Office in U.S. Appl. No. 14/424,250.
Notice of Allowance, dated Nov. 27, 2017, issued by the U.S. Patent and Trademark Office in U.S. Appl. No. 14/424,250.
Corrected Notice of Allowability, dated Jan. 11, 2018, issued by the U.S. Patent and Trademark Office in U.S. Appl. No. 14/424,250.

* cited by examiner

ELECTRICAL STORAGE SYSTEM

BACKGROUND OF THE INVENTION

1. Field of the Invention

The invention relates to a technique for interrupting energization of an electrical storage device irrespective of control (program control) executed by a controller.

2. Description of Related Art

There has been suggested a technique for turning off a system main relay when charging current flows through a secondary battery in order to prevent overcharging of the secondary battery. By turning off the system main relay, it is possible to interrupt connection of the secondary battery with a load, it is possible to stop charging the secondary battery, and it is possible to prevent overcharging of the secondary battery.

On/off control over the system main relay is executed by a central processing unit (CPU) included in an electronic control unit (ECU). The CPU executes not only drive control over the system main relay but also other control, and sometimes changes a program incorporated in the CPU. Here, when the program is changed, it is necessary to check whether drive control over the system main relay, in other words, control for preventing overcharging, is normally executed after the program is changed.

SUMMARY OF THE INVENTION

An aspect of the invention provides an electrical storage system. The electrical storage system includes an electrical storage device in which a plurality of electrical storage blocks are connected in series with each other, a relay, a controller and a current interruption circuit. The relay is configured to switch between an on state where the electrical storage device is connected to a load and an off state where connection of the electrical storage device with the load is interrupted. The controller is configured to control an on-off state of the relay. The current interruption circuit is configured to interrupt energization of the electrical storage device by causing the relay to switch from the on state to the off state.

The current interruption circuit includes an alarm circuit, a latch circuit and a transistor. The alarm circuit is configured to output an alarm signal indicating that any one of the electrical storage blocks is in an overcharged state or an overdischarged state by comparing an input voltage value of each electrical storage block with a threshold. The latch circuit is configured to retain the alarm signal and output the retained signal. The transistor is configured to cause the relay to switch from the on state to the off state upon reception of an output signal of the latch circuit. The controller is configured to execute control for causing the relay to switch into the on state and determine an energization state of the electrical storage device while control for causing the alarm circuit to output the alarm signal is being executed by changing one of the voltage value and the threshold, input to the alarm circuit.

Each electrical storage block may be formed of at least one electrical storage element is charged or discharged. Specifically, each electrical storage block may be formed of a single electrical storage element or may be formed of a plurality of electrical storage elements. When each electrical storage block is formed of a plurality of electrical storage elements, the plurality of electrical storage elements may be connected in series with each other or connected in parallel with each other.

According to the aspect of the invention, the controller is able to cause the relay to switch between the on state and the off state by outputting a control signal. In addition, in the aspect of the invention, it is possible to cause the relay to switch from the on state to the off state with the use of the current interruption circuit through a line different from a line through which the controller controls the relay.

That is, the current interruption circuit is able to cause the relay to switch from the on state to the off state independently of control executed by the controller. Therefore, even when a program (microcomputer) included in the controller is changed, it is possible to cause the relay to switch from the on state to the off state with the use of the current interruption circuit when any one of the electrical storage blocks is in an overcharged state or overdischarged state. In this way, irrespective of the controller, it is possible to continuously use the current interruption circuit, and it is possible to improve the general versatility of the current interruption circuit.

The operation of the current interruption circuit does not include program processing, so it is possible to cause the relay to switch from the on state to the off state without taking a bug of a program into consideration. Electrical elements included in the current interruption circuit may be formed of semiconductor elements of which abrasion degradation (aged degradation) is hard to advance, so it is possible to improve the reliability of the component.

Furthermore, in the aspect of the invention, even when each of the electrical storage blocks is not in an overcharged state or overdischarged state, it is possible to cause the current interruption circuit (alarm circuit) to output the alarm signal through control executed by the controller. Here, when the current interruption circuit is operating normally, it is possible to cause the relay to switch from the on state to the off state in response to the alarm signal, so it is possible to interrupt energization of the electrical storage device. On the other hand, when the current interruption circuit is not operating normally, no alarm signal is output, so it is not possible to cause the relay to switch from the on state to the off state. Accordingly, it is not possible to interrupt energization of the electrical storage device.

Therefore, the controller is able to determine whether the current interruption circuit is operating normally when it is determined whether the electrical storage device is in an energized state or a non-energized state while control for causing the alarm circuit to output the alarm signal is being executed. Specifically, when the electrical storage device becomes the energized state as a result of control for causing the relay to turn on while control for causing the alarm circuit to output the alarm signal is being executed, the alarm signal is not actually output, and it may be determined that the current interruption circuit is in an abnormal state. In addition, when the electrical storage device is in the non-energized state while control for causing the alarm circuit to output the alarm signal is being executed, the alarm signal is actually output, and it may be determined that the current interruption circuit is in a normal state.

Here, in order to determine whether the current interruption circuit is in the normal state (or the abnormal state), it is conceivable to set the electrical storage device in the energized state by causing the relay to turn on before control for causing the alarm circuit to output the alarm signal is executed. That is, when the electrical storage device is set in the energized state and then the electrical storage device becomes the non-energized state as a result of control for causing the alarm circuit to output the alarm signal, it may be determined that the current interruption circuit is in the normal state. However, in this case, it is required to cause the relay to turn on before control for causing the alarm circuit to output the alarm signal is executed, so the number of times the relay is operated increases in order to determine whether the current interruption circuit is in the normal state. When the number of times the relay is operated increases, the service life of the relay reduces.

Therefore, in the aspect of the invention, control for causing the relay to turn on is executed while control for causing the current interruption circuit (alarm circuit) to output the alarm signal is being executed. When the current interruption circuit is in the normal state, the relay does not actually turn on even when control for causing the relay to turn on is executed while the alarm signal is being output. Therefore, by confirming the non-energized state of the electrical storage device when control for causing the alarm circuit to output the alarm signal is being executed, it is possible to determine that the current interruption circuit is in the normal state. In this way, even when the relay is not actually turned on, it is possible to determine whether the current interruption circuit is in the normal state. Thus, the number of times the relay is operated does not increase in order to determine whether the current interruption circuit is in the normal state, so it is possible to extend the service life of the relay.

When the current interruption circuit is in the abnormal state, the relay actually turns on as a result of control for causing the relay to turn on. In this case, by confirming the energized state of the electrical storage device, it is possible to determine that the current interruption circuit is in the abnormal state.

Here, it is possible to determine whether the electrical storage device is in the energized state or the non-energized state with the use of a voltage sensor configured to detect a voltage value of the electrical storage device or a current sensor configured to detect a current value of the electrical storage device. When the electrical storage device is connected to the load and is in the energized state, the voltage value of the electrical storage device is detected by the voltage sensor or current flowing through the electrical storage device is detected by the current sensor.

On the other hand, when the electrical storage device is not connected to the load and is in the non-energized state, the voltage value of the electrical storage device is not detected by the voltage sensor or current flowing through the electrical storage device is not detected by the current sensor. Therefore, the controller is able to determine whether the electrical storage device is in the energized state or the non-energized state on the basis of an output of one of the voltage sensor and the current sensor.

The relay may be kept in the on state after control for causing the alarm circuit to output the alarm signal is ended. Thus, when the electrical storage device is connected to the load, it is possible to determine whether the current interruption circuit is in the abnormal state. On the other hand, it is possible to cause the relay to switch from the on state to the off state while control for causing the alarm circuit to output the alarm signal is being executed. Here, the relay may be caused to switch from the on state to the off state before control for causing the alarm circuit to output the alarm signal is ended or when control for causing the alarm circuit to output the alarm signal is ended. Thus, when connection of the electrical storage device with the load is interrupted, it is possible to determine whether the current interruption circuit is in the abnormal state.

The relay may include a first relay and a second relay respectively provided in a positive electrode line and a negative electrode line that connect the electrical storage device to the load, and a third relay connected in parallel with the second relay in a state where the third relay is connected in series with a resistor. In this case, for example, while control for causing the alarm circuit to output the alarm signal is being executed, control for causing the first relay and the third relay to turn on may be executed.

When the electrical storage device is connected to the load, the following first process to third process may be executed in a state where the first relay is kept in the on state. In the first process, the third relay is caused to switch from the on state to the off state while control for causing the alarm circuit to output the alarm signal is being executed. That is, the third relay is caused to switch from the on state to the off state while control for causing the alarm circuit to output the alarm signal is being executed.

In the second process, the third relay is caused to switch from the off state to the on state after control for causing the alarm circuit to output the alarm signal is executed. In the third process, the third relay is caused to switch from the on state to the off state and the second relay is caused to switch from the off state to the on state after the second process. After the first process to the third process are executed, the process of connecting the electrical storage device to the load may be completed.

Here, it may be determined whether the third relay is in a fixed state on the basis of determination as to the energization state of the electrical storage device when control for causing the third relay to switch into the off state is executed after control for causing the alarm circuit to output the alarm signal is executed. Because the first relay is kept in the on state, even when control for causing the third relay to turn off is executed, but when the electrical storage device remain in the energized state, it may be determined that the third relay is fixed in the on state.

When connection of the electrical storage device with the load is interrupted, the first relay and the third relay may be caused to switch from the on state to the off state while control for causing the alarm circuit to output the alarm signal is being executed. Specifically, the first relay and the third relay may be caused to switch from the on state to the off state before control for causing the alarm circuit to output the alarm signal is ended or when control for causing the alarm circuit to output the alarm signal is ended.

Here, the energization state of the electrical storage device may be determined by causing the first relay and the second relay to switch from the on state to the off state at mutually different timings before control for causing the alarm circuit to output the alarm signal is executed. When control for causing one of the first relay and the second relay to turn on and control for causing the other one of the first relay and the second relay to turn off are being executed, and when the electrical storage device is in the energized state, it may be determined that the other one of the first relay and the second relay is fixed in the on state.

In addition the energization state of the electrical storage device may be determined by causing the third relay to switch from the off state to the on state after the first relay and the second relay are caused to switch into the off state. When the electrical storage device becomes the energized state at the time when the third relay is in the on state, it may be determined that the first relay is fixed in the on state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described.

Figure 1:
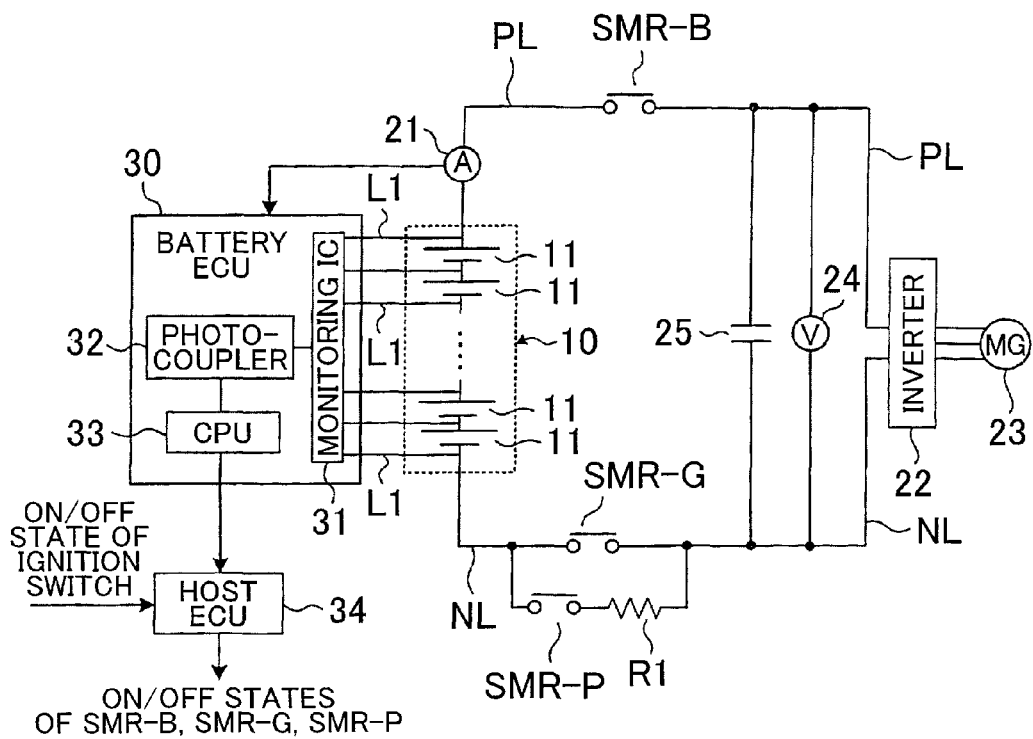
FIG. 1 is a view that shows the configuration of a battery system.

FIG. 1 is a view that shows the configuration of a battery system (which corresponds to an electrical storage system according to the invention) according to a first embodiment. The battery system shown in FIG. 1 may be, for example, mounted on a vehicle. The vehicle is allowed to travel using an output of a battery pack 10. The invention may be applied to a device other than the vehicle.

The battery pack 10 includes a plurality of single cells (which correspond to electrical storage elements according to the invention) 11 that are electrically connected in series with one another. Each single cell 11 may be a secondary battery, such as a nickel metal hydride battery and a lithium ion battery. Instead of the secondary battery, an electric double layer capacitor may be used. The number of the single cells 11 may be set as needed on the basis of a required output, or the like, of the battery pack 10. In the present embodiment, all the single cells 11 that constitute the battery pack 10 are electrically connected in series with one another; instead, the battery pack 10 may include a plurality of the single cells 11 that are electrically connected in parallel with one another.

A current sensor 21 detects a current flowing through the battery pack 10, and outputs the detected result to a battery electronic control unit (ECU) 30. The battery ECU 30 outputs the current value detected by the current sensor 21 to a host electronic control unit (ECU) 34. Here, when the battery pack 10 is being discharged, a positive value may be used as the current value detected by the current sensor 21. When the battery pack 10 is being charged, a negative value may be used as the current value detected by the current sensor 21.

In the present embodiment, the current sensor 21 is provided in a positive electrode line PL connected to a positive electrode terminal of the battery pack 10. The current sensor 21 just needs to be able to detect a current flowing through the battery pack 10. The location at which the current sensor 21 is provided may be set as needed. Specifically, the current sensor 21 may be provided in the positive electrode line PL or in a negative electrode line NL connected to a negative electrode terminal of the battery pack 10. A plurality of the current sensors 21 may be used.

A system main relay SMR-B (which corresponds to a first relay according to the invention) is provided in the positive electrode line PL. The system main relay SMR-B switches between an on state and an off state upon reception of a control signal from the host ECU 34. Here, the battery ECU 30 and the host ECU 34 correspond to a controller according to the invention.

Figure 2:
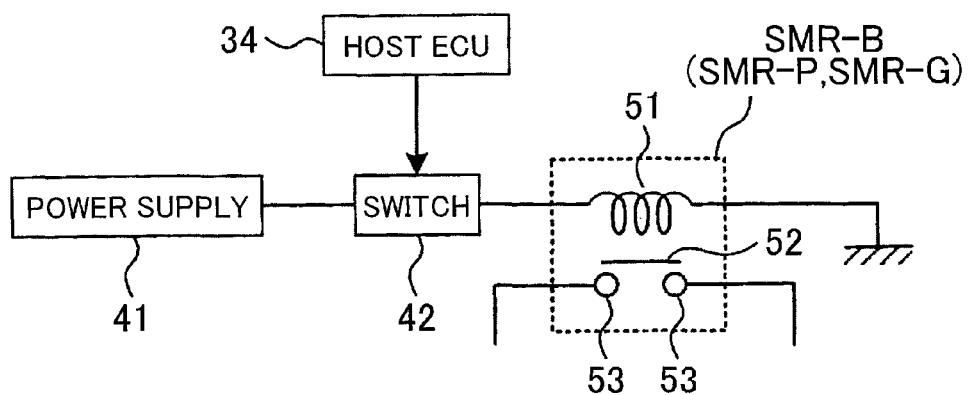
FIG. 2 is a view that shows the structure of each system main relay.

As shown in FIG. 2, the system main relay SMR-B includes an exciting coil 51, a movable contact 52 and fixed contacts 53. One end of the exciting coil 51 is connected to a power supply 41 via a switch 42, and the other end of the exciting coil 51 is grounded. For example, an auxiliary battery mounted on the vehicle may be used as the power supply 41.

The switch 42 switches between an on state and an off state upon reception of a control signal from the host ECU 34. When the switch 42 switches from the off state to the on state, current flows from the power supply 41 to the exciting coil 51, and magnetic force is generated at the exciting coil 51. On the other hand, when the switch 42 switches from the on state to the off state, energization of the exciting coil 51 from the power supply 41 is interrupted.

The movable contact 52 is, for example, urged by a spring, or the like, in a direction away from the fixed contacts 53. When current flows through the exciting coil 51, the movable contact 52 moves against the urging force due to the magnetic force generated at the exciting coil 51. Thus, the movable contact 52 contacts the fixed contacts 53, and the system main relay SMR-B switches from the off state to the on state. On the other hand, when energization of the exciting coil 51 is interrupted, the movable contact 52 moves away from the fixed contacts 53 upon reception of the urging force. Thus, the system main relay SMR-B switches from the on state to the off state.

In FIG. 1, a system main relay (which corresponds to a second relay according to the invention) SMR-G is provided in the negative electrode line NL. The system main relay SMR-G switches between an on state and an off state upon reception of a control signal from the host ECU 34. The structure of the system main relay SMR-G is similar to the structure of the system main relay SMR-B (see FIG. 2).

A system main relay (which corresponds to a third relay according to the invention) SMR-P and a current limiting resistor R1 are electrically connected in parallel with the system main relay SMR-G. The system main relay SMR-P and the current limiting resistor R1 are electrically connected in series with each other. The system main relay SMR-P switches between an on state and an off state upon reception of a control signal from the host ECU 34.

The structure of the system main relay SMR-P is similar to that of the system main relay SMR-B (see FIG. 2). The current limiting resistor R1 is used to inhibit inrush current from flowing to a capacitor 25 when the battery pack 10 is connected to a load (specifically, an inverter 22 (described later)). The capacitor 25 is connected to the positive electrode line PL and the negative electrode line NL, and is used to suppress voltage fluctuations between the positive electrode line PL and the negative electrode line NL.

A voltage sensor 24 is connected between the positive electrode line PL and the negative electrode line NL. Specifically, the voltage sensor 24 is connected to the positive electrode line PL that connects the system main relay SMR-B to the inverter 22 and the negative electrode line NL that connects the system main relay SMR-G to the inverter 22. The voltage sensor 24 detects a voltage value input to the inverter 22, that is, a voltage value of the capacitor 25, and outputs the detected result to the battery ECU 30.

The battery pack 10 is connected to the inverter 22 via the positive electrode line PL and the negative electrode line NL. When the battery pack 10 is connected to the inverter 22, the host ECU 34 turns on the system main relays SMR-B, SMR-G. Here, the detailed control over the system main relays SMR-B, SMR-G, SMR-P at the time when the battery pack 10 is connected to the inverter 22 will be described later.

When connection of the battery pack 10 with the inverter 22 has been completed, the battery system shown in FIG. 1 enters a start-up state (ready-on state). Information about the on/off state of an ignition switch of the vehicle is input to the host ECU 34. When the ignition switch switches from the off state to the on state, the host ECU 34 starts up the battery system shown in FIG. 1.

On the other hand, when the ignition switch switches from the on state to the off state, the host ECU 34 interrupts connection of the battery pack 10 with the inverter 22. Here, the detailed control over the system main relays SMR-B, SMR-G, SMR-P at the time when connection of the battery pack 10 with the inverter 22 is interrupted will be described later. When connection of the battery pack 10 with the inverter 22 is interrupted, the battery system shown in FIG. 1 enters a stopped state (ready-off) state. When the battery system is in the stopped state, the battery pack 10 is not charged or discharged.

The inverter 22 converts direct-current power, output from the battery pack 10, to alternating-current power, and outputs the alternating-current power to a motor generator (MG) 23. The motor generator 23 generates kinetic energy for propelling the vehicle upon reception of the alternating-current power output from the inverter 22. The kinetic energy generated by the motor generator 23 is transmitted to wheels, and is able to propel the vehicle.

When the vehicle is decelerated or stopped, the motor generator 23 converts kinetic energy, generated at the time of braking the vehicle, to electric energy (alternating-current power). The inverter 22 converts the alternating-current power, generated by the motor generator 23, to direct-current power, and outputs the direct-current power to the battery pack 10. Thus, the battery pack 10 is able to store regenerated electric power.

The battery ECU 30 includes a monitoring integrated circuit (IC) 31. The monitoring IC 31 is connected to the single cells 11 via voltage detection lines L1, and detects the voltage value of each of the single cells 11. Here, any two of the voltage detection lines L1 are connected to a positive electrode terminal and a negative electrode terminal of a corresponding one of the single cells 11.

In the present embodiment, the monitoring IC 31 detects the voltage value of each single cell (which corresponds to an electrical storage block according to the invention) 11; however, the invention is not limited to this configuration. For example, the monitoring IC 31 is able to detect the voltage value of a battery block (which corresponds to the electrical storage block according to the invention) that includes a plurality of the single cells 11. Here, any two of the voltage detection lines L1 are connected to a positive electrode terminal and a negative electrode terminal of a corresponding one of the battery blocks.

Each battery block may be, for example, formed of a plurality of the single cells 11 electrically connected in series with each other. In addition, each battery block may be, for example, formed of a plurality of the single cells 11 electrically connected in parallel with each other. The battery pack 10 may be formed by electrically connecting the plurality of battery blocks in series with one another.

The battery ECU 30 includes a photocoupler 32 and a central processing unit (CPU) 33. An output of the monitoring IC 31 is input to the CPU 33 via the photocoupler 32. Here, by using the photocoupler 32, it is possible to set a circuit located at the input side of the photocoupler 32 and a circuit located at the output side of the photocoupler 32 in an electrically insulated state. The CPU 33 is able to acquire the voltage value of each single cell 11 on the basis of the output of the monitoring IC 31.

The battery ECU 30 (CPU 33) outputs the acquired voltage value of each single cell 11 to the host ECU 34. The host ECU 34 acquires the voltage value of each single cell 11 from the battery ECU 30. Thus, the host ECU 34 is able to control the charging or discharging operation of the battery pack 10 on the basis of the acquired voltage value. The process of controlling the charging or discharging operation of the battery pack 10 will be described later.

In the present embodiment, the battery pack 10 is connected to the inverter 22; however, the invention is not limited to this configuration. Specifically, a step-up circuit may be provided in a current path that connects the battery pack 10 to the inverter 22. The step-up circuit is able to step up the output voltage of the battery pack 10 and output the stepped-up electric power to the inverter 22. The step-up circuit is also able to step down the output voltage of the inverter 22 and output the stepped-down electric power to the battery pack 10.

Figure 3:
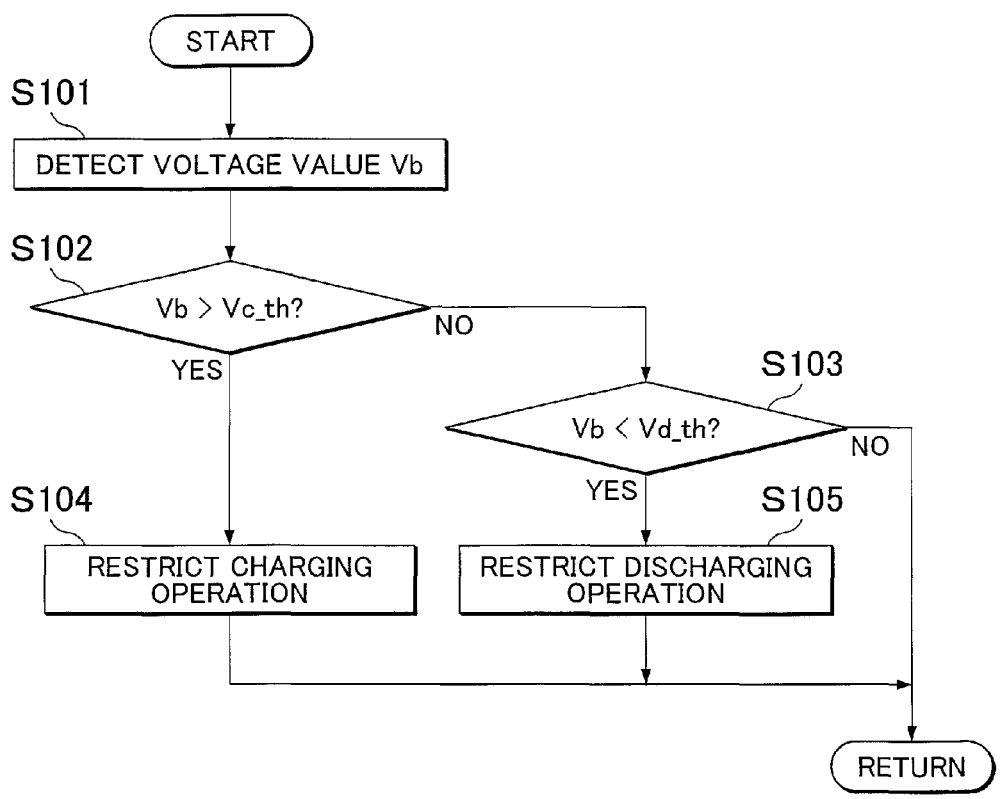
FIG. 3 is a flowchart that shows the process of controlling charging or discharging operation of a battery pack on the basis of a voltage value of each single cell.

Next, the process (one example) of controlling the charging or discharging operation of the battery pack 10 on the basis of the voltage value of each single cell 11 will be described with reference to the flowchart shown in FIG. 3. Here, the process shown in FIG. 3 is executed by the host ECU 34. Specifically, the host ECU 34 executes the process shown in FIG. 3 on the basis of a computer program embedded in the host ECU 34. In addition, the process shown in FIG. 3 is repeatedly executed at predetermined intervals.

In step S101, the host ECU 34 acquires a voltage value Vb of each single cell 11. Here, the battery ECU 30 detects the voltage value Vb of each single cell 11 with the use of the monitoring IC 31, and outputs the detected result to the host ECU 34.

In step S102, the host ECU 34 determines whether the voltage value Vb is higher than an upper limit voltage value Vc_th. The upper limit voltage value Vc_th is a predetermined voltage value in order to prevent overcharging of each single cell 11. That is, when the voltage value Vb is higher than the upper limit voltage value Vc_th, the host ECU 34 is allowed to determine that the corresponding single cell 11 can reach an overcharged state. In addition, when the voltage value Vb is lower than or equal to the upper limit voltage value Vc_th, the host ECU 34 is allowed to determine that the corresponding single cell 11 cannot reach the overcharged state.

Determination as to whether the single cell 11 can reach the overcharged state is desirably carried out before the single cell 11 actually reaches the overcharged state. Therefore, the upper limit voltage value Vc_th may be set to a value lower than the voltage value of the single cell 11, at which the single cell 11 actually becomes the overcharged state. Information about the upper limit voltage value Vc_th may be stored in a memory.

In the present embodiment, the voltage values of the plurality of single cells 11 are detected, and the overcharged state of any one of the single cells 11 is prevented. There may occur variations in self-discharge characteristics or variations in internal resistance among the plurality of single cells 11, and, due to the variations, there may occur variations in voltage value among the plurality of single cells 11. Therefore, when it is determined whether the single cell 11 is in the overcharged state, it is desirable to compare the highest voltage value Vb with the upper limit voltage value Vc_th.

When the voltage value Vb is higher than the upper limit voltage value Vc_th, the host ECU 34 executes the process of step S104. On the other hand, when the voltage value Vb is lower than or equal to the upper limit voltage value Vc_th, the host ECU 34 executes the process of step S103.

In step S103, the host ECU 34 determines whether the voltage value Vb is lower than a lower limit voltage value Vd_th. The lower limit voltage value Vd_th is a predetermined voltage value in order to prevent overdischarging of each single cell 11. That is, when the voltage value Vb is lower than the lower limit voltage value Vd_th, the host ECU 34 is allowed to determine that the single cell 11 can reach an overdischarged state. In addition, when the voltage value Vb is higher than or equal to the lower limit voltage value Vd_th, the host ECU 34 is allowed to determine that the single cell 11 cannot reach the overdischarged state.

Determination as to whether the single cell 11 can reach the overdischarged state is desirably carried out before the single cell 11 actually reaches the overdischarged state. Therefore, the lower limit voltage value Vd_th may be set to a value lower than the voltage value of the single cell 11, at which the single cell 11 actually becomes the overdischarged state. Information about the lower limit voltage value Vd_th may be stored in the memory.

In the present embodiment, the voltage values of the plurality of single cells 11 are detected, and the overdischarged state of any one of the single cells 11 is prevented. As described above, there may occur variations in voltage value among the plurality of single cells 11 due to variations in self-discharge characteristics or variations in internal resistance. Therefore, when it is determined whether the single cell 11 is in the overdischarged state, it is desirable to compare the lowest voltage value Vb with the lower limit voltage value Vd_th.

When the voltage value Vb is lower than the lower limit voltage value Vd_th, the host ECU 34 executes the process of step S105. On the other hand, when the voltage value Vb is higher than or equal to the lower limit voltage value Vd_th, the host ECU 34 ends the process shown in FIG. 3.

In step S104, the host ECU 34 restricts the charging operation of the battery pack 10. Specifically, the host ECU 34 is able to restrict the charging operation of the battery pack 10 by decreasing an upper limit electric power Win at or below which the charging operation of the battery pack 10 is allowed. Here, the host ECU 34 controls the charging operation of the battery pack 10 such that the input electric power (charging electric power) of the battery pack 10 does not exceed the upper limit electric power Win.

The upper limit electric power Win may be preset on the basis of the temperature and state of charge (SOC) of the battery pack 10. Here, the SOC indicates the percentage of a current charge capacity with respect to a full charge capacity. Specifically, the upper limit electric power Win is decreased as the temperature of the battery pack 10 increases or the upper limit electric power Win is decreased as the temperature of the battery pack 10 decreases. In addition, the upper limit electric power Win is decreased as the SOC of the battery pack 10 increases. In the process of step S104, the upper limit electric power Win is decreased below a preset value on the basis of the temperature and SOC of the battery pack 10.

In step S105, the host ECU 34 restricts the discharging operation of the battery pack 10. Specifically, the host ECU 34 is able to restrict the discharging operation of the battery pack 10 by decreasing an upper limit electric power Wout at or below which the discharging operation of the battery pack 10 is allowed. Here, the host ECU 34 controls the discharging operation of the battery pack 10 such that the output electric power (discharging electric power) of the battery pack 10 does not exceed the upper limit electric power Wout.

The upper limit electric power Wout may be preset on the basis of the temperature and state of charge (SOC) of the battery pack 10. Specifically, the upper limit electric power Wout is decreased as the temperature of the battery pack 10 increases or the upper limit electric power Wout is decreased as the temperature of the battery pack 10 decreases. In addition, the upper limit electric power Wout is decreased as the SOC of the battery pack 10 decreases.

In the process of step S105, the upper limit electric power Wout is decreased below a preset value on the basis of the temperature and SOC of the battery pack 10. Restricting the discharging operation of the battery pack 10 includes stopping the discharging operation of the battery pack 10. Here, when the upper limit electric power Wout is set to 0 [kW], it is possible to stop the discharging operation of the battery pack 10.

In the process shown in FIG. 3, the charging or discharging operation of the battery pack 10 is controlled on the basis of the voltage value Vb of each single cell 11; however, the invention is not limited to this configuration. For example, it is applicable that the SOC of the battery pack 10 is calculated and then the charging or discharging operation of the battery pack 10 is controlled on the basis of the calculated SOC. For example, when the vehicle is caused to travel with the use of the battery pack 10 and a power source (such as an engine and a fuel cell) other than the battery pack 10, it is possible to control the charging or discharging operation of the battery pack 10 such that the SOC of the battery pack 10 varies along a reference SOC.

Here, the SOC of the battery pack 10 may be calculated using the voltage value Vb of each single cell 11 and a current value flowing through each single cell 11. There have been suggested various methods of calculating the SOC in the existing art, and these suggestions may be employed as needed. Therefore, the detailed description of the method of calculating the SOC is omitted.

Figure 4:
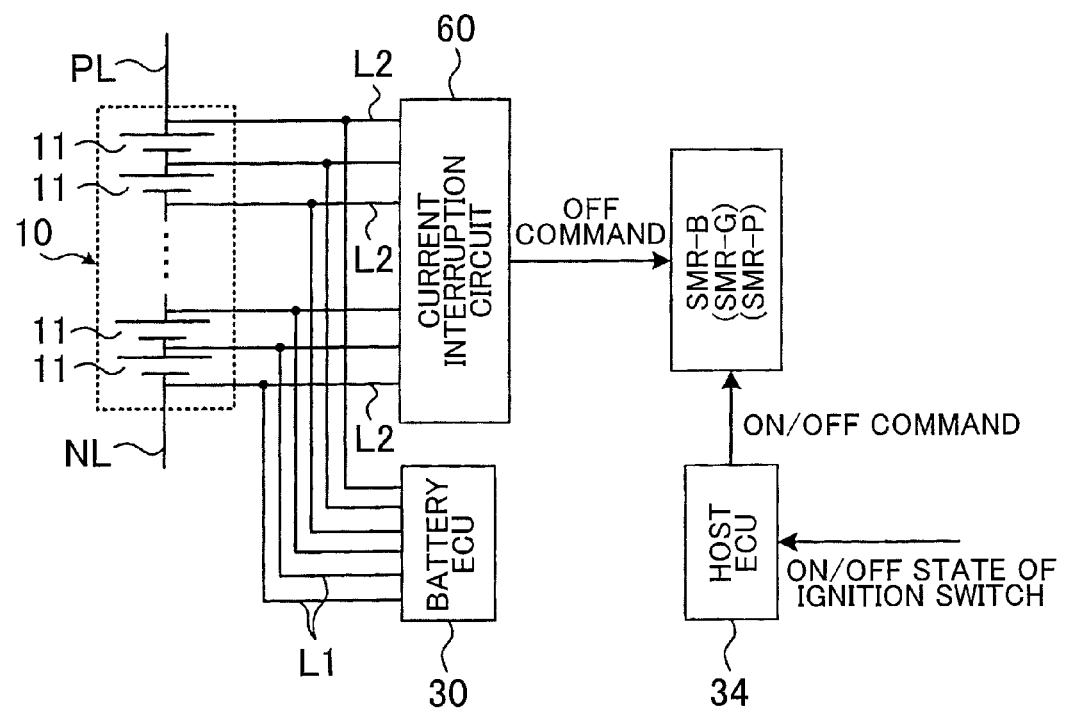
FIG. 4 is a view that shows the configuration of part of a battery system.

As shown in FIG. 4, a current interruption circuit 60 is connected to the battery pack 10 via voltage detection lines L2. Here, each voltage detection line L2 branches off from the corresponding voltage detection line L1, and the number of the voltage detection lines L2 provided is equal to the number of the voltage detection lines L1.

Any two of the plurality of voltage detection lines L2 are connected to the positive electrode terminal and negative electrode terminal of a corresponding one of the single cells 11. The current interruption circuit 60 is able to detect the voltage value of each single cell 11. As described above, when any two of the plurality of voltage detection lines L2 are connected to the positive electrode terminal and negative electrode terminal of a corresponding one of battery blocks, the current interruption circuit 60 is able to detect the voltage value of each battery block with the use of the plurality of voltage detection lines L2.

The current interruption circuit 60 interrupts connection of the battery pack 10 with the inverter 22 when any one of the single cells 11 is in the overcharged state. Specifically, when any one of the single cells 11 is in the overcharged state, the current interruption circuit 60 causes the system main relays SMR-B, SMR-G, SMR-P to switch from the on state to the off state. Here, it is just required to be able to interrupt connection of the battery pack 10 with the inverter 22, so the current interruption circuit 60 just needs to cause at least one of the system main relays SMR-B, SMR-G, SMR-P to switch from the on state to the off state. When the battery system shown in FIG. 1 is in the start-up state (ready-on state), the current interruption circuit 60 just needs to cause at least one of the system main relays SMR-B, SMR-G to switch from the on state to the off state.

Specifically, when the voltage value of any one of the single cells 11 is higher than the voltage value corresponding to the overcharged state, the current interruption circuit 60 is able to cause the system main relays SMR-B, SMR-G, SMR-P to switch from the on state to the off state by interrupting energization of the exciting coils 51.

In the present embodiment, the system main relays SMR-B, SMR-G, SMR-P switch between the on state and the off state upon reception of commands from the host ECU 34 or switch between the on state and the off state upon reception of commands from the current interruption circuit 60. That is, a command line for causing the system main relays SMR-B, SMR-G to switch between the on state and the off state includes a command line via the host ECU 34 and a command line via the current interruption circuit 60.

These command lines are independent of each other as shown in FIG. 4. That is, the current interruption circuit 60 is able to cause the system main relays SMR-B, SMR-G, SMR-P to switch from the on state to the off state irrespective of control executed by the host ECU 34. Here, when the current interruption circuit 60 causes the system main relays SMR-B, SMR-G, SMR-P to remain in the off state, the host ECU 34 cannot cause the system main relays SMR-B, SMR-G, SMR-P to switch from the off state to the on state.

Next, the configuration of the current interruption circuit 60 will be described with reference to FIG. 5.

The current interruption circuit 60 includes resistors R2. Each resistor R2 is provided in a corresponding one of the voltage detection lines L2. The resistors R2 are used in order to prevent application of overvoltage from the battery pack 10 (single cells 11) to the current interruption circuit 60. That is, when overvoltage is about to be applied to the current interruption circuit 60, application of overvoltage to the current interruption circuit 60 is prevented through melting of the corresponding resistors R2.

The current interruption circuit 60 includes a plurality of Zener diodes D. Each Zener diode D is electrically connected in parallel with a corresponding one of the single cells 11 via the corresponding two of the voltage detection lines L2. Here, the cathode of each Zener diode D is connected to the positive electrode terminal of the corresponding single cell 11, and the anode of each Zener diode D is connected to the negative electrode terminal of the corresponding single cell 11. The plurality of Zener diodes D are electrically serially connected to one another.

The Zener diodes D are used in order to prevent application of overvoltage from the battery pack 10 (the single cells 11) to the current interruption circuit 60. That is, when overvoltage is about to be applied to the current interruption circuit 60, the corresponding Zener diode D enters a conductive state and is able to flow current from the cathode side to the anode side. Thus, it is possible to prevent application of overvoltage to an integrated circuit (IC) 61 (described later) side.

When the Zener diode D enters the conductive state, the Zener diode D causes current to flow through the corresponding resistors R2 and is able to melt the resistors R2. That is, when overvoltage is applied from the battery pack 10 to the IC 61, it is possible to interrupt connection of the battery pack 10 with the IC 61 through melting of the resistors R2. Thus, it is possible to protect the IC 61. If application of overvoltage to the current interruption circuit 60 is excluded, the Zener diodes D may be omitted.

The current interruption circuit 60 includes capacitors C. Each capacitor C is electrically connected in parallel with the corresponding single cell 11 via the corresponding two of the voltage detection lines L2. Here, a connection point of each capacitor C with one of the corresponding two voltage detection lines L2 is located between a connection point of the corresponding Zener diode D (cathode) with the one of the corresponding two voltage detection lines L2 and a corresponding one of comparators CMP.

In addition, a connection point of each capacitor C with the other one of the corresponding two voltage detection lines L2 is located between a connection point of the corresponding Zener diode D (anode) with the other one of the corresponding two voltage detection lines L2 and the corresponding one of the comparators CMP. The plurality of capacitors C provided in correspondence with the plurality of single cells 11 are electrically connected in series with one another.

The current interruption circuit 60 includes the IC 61. The IC 61 receives a start-up signal or a stop signal from the battery ECU 30. The start-up signal is a signal for allowing electric power to be supplied from the power supply to the IC 61. The IC 61 is allowed to operate in response to the start-up signal. The stop signal is a signal for stopping supply of electric power from the power supply to the IC 61. The operation of the IC 61 is allowed to be stopped in response to the stop signal.

If the operation of the IC 61 is allowed to be stopped by the battery ECU 30, it is possible to also stop the operation of the IC 61 at the time when the battery system shown in FIG. 1 is stopped. Thus, it is possible to reduce electric power consumed by the IC 61.

The IC 61 includes the comparators CMP. The voltage detection line L2 connected to the positive electrode terminal of each single cell 11 is connected to a negative input terminal of the corresponding comparator CMP. In addition, the voltage detection line L2 connected to the negative electrode terminal of each single cell 11 is connected to a positive input terminal of the corresponding comparator CMP.

Figure 5:
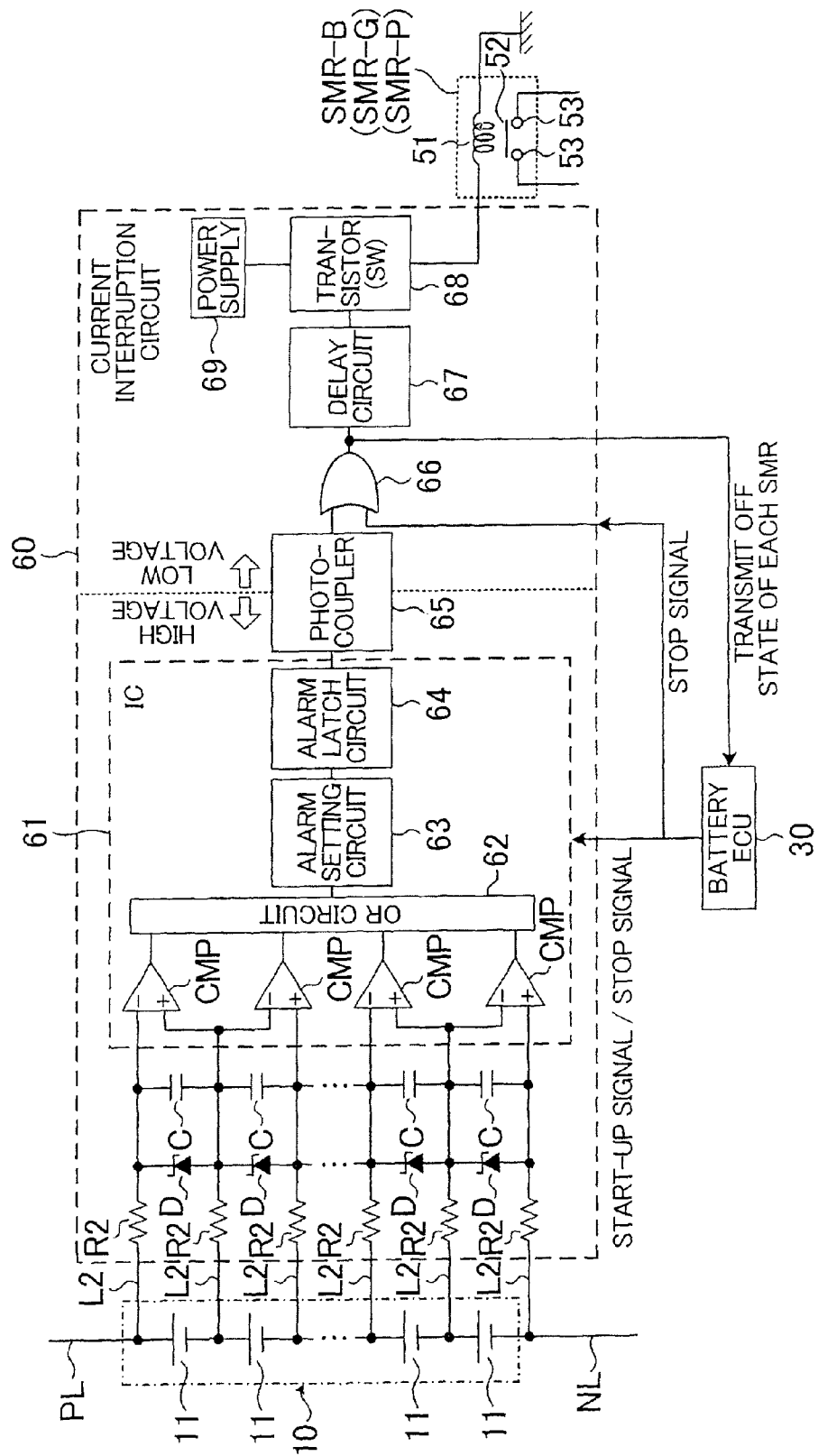
FIG. 5 is a view that shows the configuration of a current interruption circuit.

Here, as shown in FIG. 5, the voltage detection line L2 connected to the positive electrode terminal of one of the adjacent two single cells 11 and the negative electrode terminal of the other one of the adjacent two single cells 11 is branched off. The branched voltage detection lines L2 are respectively connected to the positive input terminal of one of the adjacent two comparators CMP and the negative input terminal of the other one of the adjacent two comparators CMP.

Each comparator CMP outputs a potential difference between the positive electrode terminal and negative electrode terminal of the corresponding single cell 11, in other words, the voltage value of the corresponding single cell 11.

In the configuration shown in FIG. 5, each comparator CMP detects the voltage value of the corresponding capacitor C. That is, in the configuration shown in FIG. 5, each capacitor C is charged with electric charge in the corresponding single cell 11, with the result that the voltage value of each capacitor C becomes equal to the voltage value of the corresponding single cell 11. Each comparator CMP detects the voltage value (stabilized voltage value) of the corresponding capacitor C.

The IC 61 includes an OR circuit 62 connected to the comparators CMP. An output signal of each comparator CMP is input to the OR circuit 62. The OR circuit 62 is connected to the plurality of comparators CMP. When the output signal of any one of the comparators CMP is input to the OR circuit 62, the OR circuit 62 generates an output signal.

In the present embodiment, the plurality of comparators CMP operate at mutually different timings. That is, the output signals of the plurality of comparators CMP are input to the OR circuit 62 at mutually different timings. Therefore, each time the voltage value of each single cell 11 is detected, the OR circuit 62 outputs a signal corresponding to the detected voltage value.

The IC 61 includes an alarm setting circuit (which corresponds to an alarm circuit according to the invention) 63 connected to the OR circuit 62. The output signal of the OR circuit 62 is input to the alarm setting circuit 63. The alarm setting circuit 63 determines whether any one of the single cells 11 is in the overcharged state, and outputs the alarm signal when any one of the single cells 11 is in the overcharged state. The alarm signal is a signal that indicates that any one of the single cells 11 is in the overcharged state.

Figure 6:
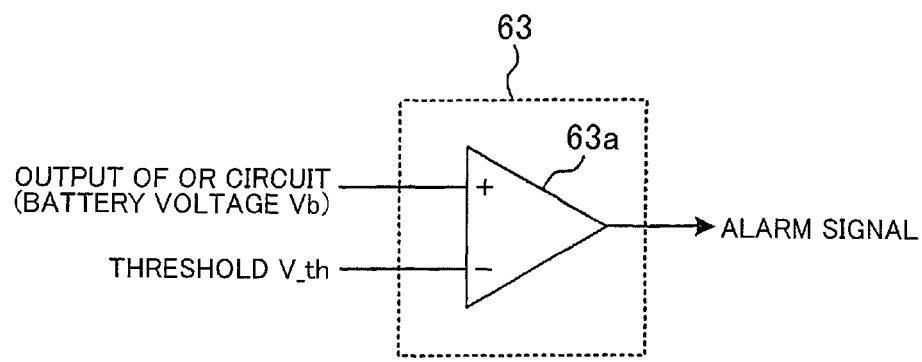
FIG. 6 is a view that shows the configuration of an alarm setting circuit.

Specifically, as shown in FIG. 6, the alarm setting circuit 63 may be formed of a comparator 63a. The output signal of the OR circuit 62 (the voltage value Vb of any one of the single cells 11) is input to a positive input terminal of the comparator 63a. In addition, a threshold (voltage value) V_th is input to a negative input terminal of the comparator 63a.

Here, the threshold (voltage value) V_th is a voltage value for determining whether any one of the single cells 11 is in the overcharged state, and may be set as needed in consideration of, for example, the charging and discharging characteristics of each single cell 11. For example, the threshold (voltage value) V_th may be set to a voltage value at which each single cell 11 actually becomes the overcharged state or may be set to a value lower than the voltage value at which each single cell 11 actually becomes the overcharged state. Here, the threshold (voltage value) V_th may be set to a value higher than the upper limit voltage value Vc_th described in the process of step S102 shown in FIG. 3.

When the output signal of the OR circuit 62 (the voltage value Vb of any one of the single cells 11) is higher than the threshold (voltage value) V_th, the output signal (alarm signal) of the comparator 63a is generated. On the other hand, when the output signal of the OR circuit 62 (the voltage value Vb of each single cell 11) is lower than or equal to the threshold (voltage value) V_th, no output signal (alarm signal) of the comparator 63a is generated.

Figure 7:
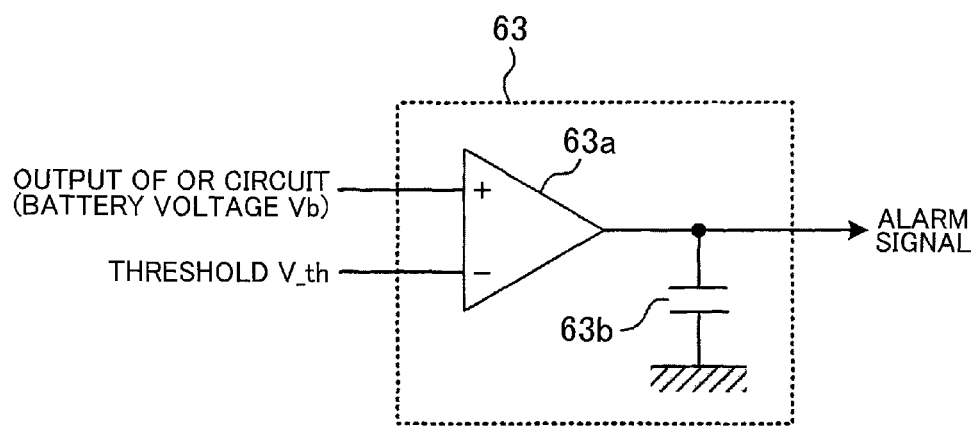
FIG. 7 is a view that shows the configuration of another alarm setting circuit.

On the other hand, the configuration shown in FIG. 7 may be used as the alarm setting circuit 63. In FIG. 7, one end of a capacitor 63b is connected to an output line of the comparator 63a. In addition, the other end of the capacitor 63b is grounded. By providing the capacitor 63b, it is possible to suppress inclusion of noise in the output signal of the alarm setting circuit 63. That is, by removing noise with the use of the capacitor 63b, it is possible to improve the reliability of the output signal (alarm signal) of the alarm setting circuit 63.

In FIG. 5, the IC 61 includes an alarm latch circuit 64 connected to the alarm setting circuit 63. An output signal (alarm signal) of the alarm setting circuit 63 is input to an alarm latch circuit 64. The alarm latch circuit 64 retains an input signal from the alarm setting circuit 63, and outputs a latched signal (corresponding to the alarm signal).

The IC 61 (alarm latch circuit 64) is connected to the photocoupler 65. The photocoupler 65 is used as a switch element, and switches from an off state to an on state upon reception of the latched signal from the alarm latch circuit 64. The photocoupler 65 is an electrically insulating element, so it is possible to electrically insulate a circuit (high voltage circuit) located at the input side of the photocoupler 65 and a circuit (low voltage circuit) located at the output side of the photocoupler 65 from each other. In other words, the photocoupler 65 is able to convert a high voltage signal as an input signal to a low voltage signal as an output signal.

The photocoupler 65 is connected to an input terminal of an OR circuit 66. When the photocoupler 65 switches from the off state to the on state, the output signal of the photocoupler 65 is input to the input terminal of the OR circuit 66. When the output signal of the photocoupler 65 is input to the OR circuit 66, an output signal (corresponding to the alarm signal) of the OR circuit 66 is generated.

In the present embodiment, the photocoupler 65 is provided between the alarm latch circuit 64 and the OR circuit 66; however, the invention is not limited to this configuration. For example, the photocoupler 65 may be provided between the alarm setting circuit 63 and the alarm latch circuit 64.

An output terminal of the OR circuit 66 is connected to a delay circuit 67. The output signal of the OR circuit 66 is input to the delay circuit 67. The delay circuit 67 outputs a signal (corresponding to the alarm signal) after a predetermined period of time has elapsed from when the output signal of the OR circuit 66 is input. The delay circuit 67 is connected to a transistor (switch) 68. The transistor 68 switches from an on state to an off state upon reception of the output signal of the delay circuit 67. Here, when no output signal of the delay circuit 67 is input to the transistor 68, the transistor 68 is in the on state.

One end of the transistor 68 is connected to a power supply 69. The other end of the transistor 68 is connected to the exciting coils 51 of the system main relays SMR-B, SMR-G, SMR-P. The power supply 69 shown in FIG. 5 is the same as the power supply 41 shown in FIG. 2. In addition, the transistor 68 is the same as the switch 42 shown in FIG. 2. Therefore, the transistor 68 operates upon reception of a control signal from the host ECU 34 or operates upon reception of the output signal of the delay circuit 67.

As described with reference to FIG. 2, when the transistor 68 is in the on state, the system main relays SMR-B, SMR-G, SMR-P turn on due to the fact that current flows from the power supply 69 to the exciting coils 51. On the other hand, when the transistor 68 is in the off state, supply of current from the power supply 69 to the exciting coils 51 is interrupted, and the system main relays SMR-B, SMR-G, SMR-P turn off.

According to the present embodiment, when the IC 61 detects the overcharged state of any one of the single cells 11, the output signal (alarm signal) of the IC 61 is input to the transistor 68. Thus, it is possible to cause the system main relays SMR-B, SMR-G, SMR-P to switch from the on state to the off state. Thus, it is possible to prevent the single cell 11 in the overcharged state from being charged or discharged.

In the present embodiment, the system main relays SMR-B, SMR-G, SMR-P switch between the on state and the off state upon reception of the control signals from the host ECU 34. On the other hand, when any one of the single cells 11 becomes the overcharged state, not control executed by the host ECU 34 but the current interruption circuit 60 causes the system main relays SMR-B, SMR-G, SMR-P to switch from the on state to the off state. In this way, drive control over the system main relays SMR-B, SMR-G, SMR-P is separately executed through a path that includes the host ECU 34 and a path that includes the current interruption circuit 60.

Therefore, even when the design of the host ECU 34 or the design of the battery ECU 30 is changed, the current interruption circuit 60 is not influenced by the design change. In other words, even after the design of the host ECU 34 or the design of the battery ECU 30 is changed, it is allowed to continuously use the current interruption circuit 60. The current interruption circuit 60 is an exclusive component for causing the system main relays SMR-B, SMR-G, SMR-P to turn off at the time of overcharging of any one of the single cells 11, so it is possible to improve general versatility.

As described above, the current interruption circuit 60 is formed of electronic components (mainly, semiconductor elements), and does not execute process using a computer program. Therefore, when the current interruption circuit 60 is used, it is possible to drive the system main relays SMR-B, SMR-G, SMR-P without taking a bug of a program into consideration. In addition, normally, abrasion degradation (aged degradation) is hard to occur in semiconductor elements, so it is possible to improve the reliability of the component (current interruption circuit 60) by forming the current interruption circuit 60 from the semiconductor elements.

In the configuration shown in FIG. 5, the single current interruption circuit 60 is provided in correspondence with the battery pack 10; however, the invention is not limited to this configuration. Specifically, when all the single cells 11 that constitute the battery pack 10 are separated into a plurality of groups, the current interruption circuit 60 may be provided in correspondence with each group.

Here, when the current interruption circuit 60 is provided for each group, the circuit located at the output sides of the photocouplers 65 may be shared. That is, within the current interruption circuit 60 shown in FIG. 5, the circuit located at the input side of the photocoupler 65 (including the photocoupler 65) may be provided in the number of groups. The output signal of each photocoupler 65 may be input to the OR circuit 66.

In the present embodiment, the input terminal of the OR circuit 66 is connected to the battery ECU 30, and the output signal of the battery ECU 30 is input to the input terminal of the OR circuit 66. As described above, the battery ECU 30 outputs the start-up signal or the stop signal to the IC 61. Therefore, the signal for stopping the IC 61 is also input to the OR circuit 66.

When the output signal of the photocoupler 65 is received or the stop signal for stopping the IC 61 is received from the battery ECU 30, the OR circuit 66 generates an output signal. Thus, it is possible to cause the transistor 68 to switch from the on state to the off state, so it is possible to cause the system main relays SMR-B, SMR-G to switch from the on state to the off state. Here, when no signal is output from the photocoupler 65 to the OR circuit 66 and no stop signal for stopping the IC 61 is output from the battery ECU 30, the OR circuit 66 does not generate an output signal.

As described above, even when the IC 61 outputs no alarm signal, but when the battery ECU 30 outputs the stop signal for stopping the IC 61, it is possible to turn off the system main relays SMR-B, SMR-G, SMR-P by turning off the transistor 68.

Thus, when the operation of the IC 61 is stopped, it is possible to stop the charging or discharging operation of the battery pack 10 by interrupting connection of the battery pack 10 with the inverter 22. In other words, when the operation of the IC 61 is stopped, it is possible to prevent the battery pack 10 from remaining connected with the inverter 22. Thus, while the IC 61 is not operating, it is possible to prevent the overcharged state of each single cell 11 through the charging or discharging operation of the battery pack 10.

On the other hand, the output signal of the OR circuit 66 is input to not only the delay circuit 67 but also the battery ECU 30. That is, when the alarm signal is output from the IC 61, the information is also transmitted to the battery ECU 30. Thus, the battery ECU 30 is allowed to determine that the system main relays SMR-B, SMR-G, SMR-P switch from the on state to the off state due to the overcharged state of any one of the single cells 11.

When the vehicle on which the battery system shown in FIG. 1 is mounted includes an engine, the battery ECU 30 is allowed to start the engine upon reception of the output signal (alarm signal) of the OR circuit 66. Specifically, when the output signal (alarm signal) of the OR circuit 66 is input to the battery ECU 30, the battery ECU 30 outputs information, acquired from the OR circuit 66, to the host ECU 34. The host ECU 34 starts the engine upon reception of the information from the battery ECU 30. Here, it is possible to start the engine using the output of the battery pack 10.

When the engine has been already started, it is allowed not to stop the started engine while the output signal (alarm signal) of the OR circuit 66 is input to the battery ECU 30. When there is the output signal (alarm signal) of the OR circuit 66, the system main relays SMR-B, SMR-G switch from the on state to the off state, and the battery pack 10 is not charged or discharged as described above. In this case, it is possible to ensure travel of the vehicle by not stopping the started engine.

In the present embodiment, the delay circuit 67 is provided between the OR circuit 66 and the transistor 68. Therefore, before the system main relays SMR-B, SMR-G are caused to switch from the on state to the off state on the basis of the output signal of the delay circuit 67, it is possible to start the engine by inputting the output signal of the OR circuit 66 to the battery ECU 30. That is, before the charging or discharging operation of the battery pack 10 is stopped, it is possible to cause the engine to be started.

In the configuration that the engine is started using the output electric power of the battery pack 10, if the charging or discharging operation of the battery pack 10 is stopped before the engine is started, it is not possible to start the engine using the output electric power of the battery pack 10. Therefore, in order to ensure travel of the vehicle, it is required to cause the engine to be started before the system main relays SMR-B, SMR-G are caused to switch from the on state to the off state.

In the present embodiment, it is possible to cause the system main relays SMR-B, SMR-G to switch from the on state to the off state under the condition that a period of time for starting the engine using the output electric power of the battery pack 10 is ensured with the use of the delay circuit 67. Thus, even when the charging or discharging operation of the battery pack 10 is stopped, it is possible to continuously cause the vehicle to travel with the use of the engine.

when the engine is started with the use of a power supply (for example, auxiliary battery) different from the battery pack 10, the delay circuit 67 may be omitted. When a power supply other than the battery pack 10 is used as the power supply for starting the engine, it is possible to start the engine even after the charging or discharging operation of the battery pack 10 is stopped. In this case, it is not required to delay the timing at which the system main relays SMR-B, SMR-G are caused to switch from the on state to the off state, so the delay circuit 67 may be omitted.

In the present embodiment, when the alarm signal is output from the alarm setting circuit 63, the alarm signal is retained in the alarm latch circuit 64 That is, after the alarm signal is output from the alarm setting circuit 63, the signal is continuously output from the alarm latch circuit 64, so the system main relays SMR-B, SMR-G, SMR-P remain in the off state. When the alarm latch circuit 64 is omitted, the alarm signal is output or not output from the alarm setting circuit 63 on the basis of the voltage value of each single cell 11.

Figure 8:
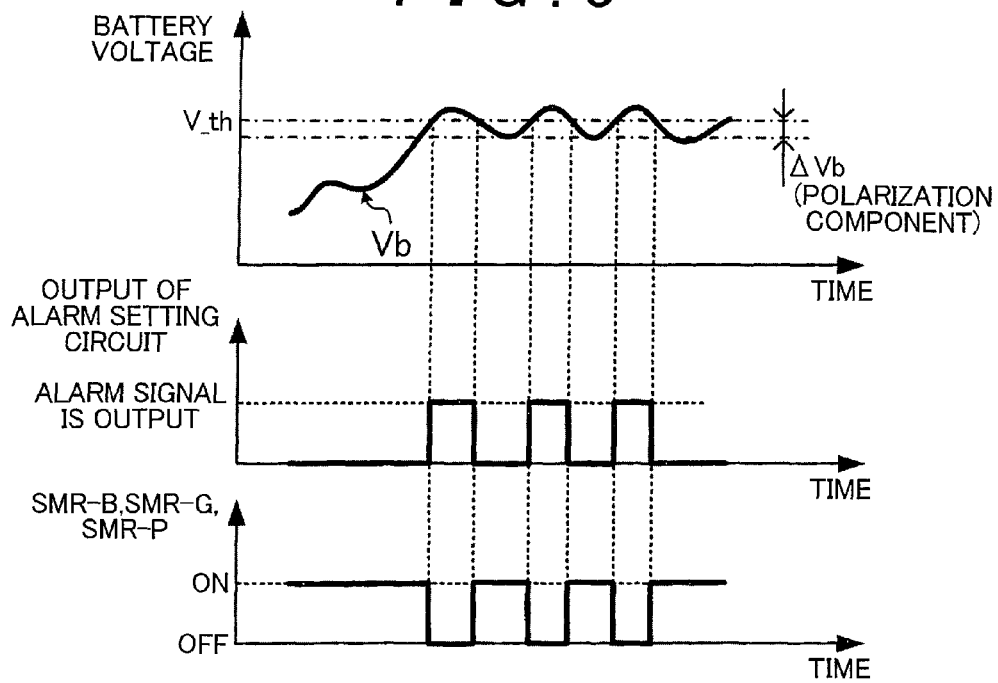
FIG. 8 is a graph that shows an output of the alarm setting circuit and operation of each system main relay in a configuration that no alarm latch circuit is provided.

FIG. 8 is a graph that shows the correlation between an output of the alarm setting circuit 63 and an on/off state of each of the system main relays SMR-B, SMR-G, SMR-P in the configuration that the alarm latch circuit 64 is omitted.

As shown in FIG. 8, the alarm signal is output from the alarm setting circuit 63 in response to the fact that the voltage value Vb of any one of the single cells 11 reaches the threshold V_th. When the alarm signal is output, the system main relays SMR-B, SMR-G, SMR-P switch from the on state to the off state. Thus, the battery pack 10 (single cells 11) stops being charged or discharged, and polarization of the battery pack 10 (single cells 11) is eliminated.

When the battery pack 10 (single cells 11) is being charged or discharged, polarization occurs in the battery pack 10, and the voltage value of each single cell 11 varies by a voltage variation caused by the polarization with respect to an open-circuit voltage. When the charging or discharging operation of the battery pack 10 (single cells 11) is stopped, polarization of each single cell 11 is eliminated, and the voltage value Vb of each single cell 11 decreases by a voltage variation (voltage drop) ΔVb corresponding to the polarization. When the polarization is eliminated, the voltage value Vb becomes the open-circuit voltage of each single cell 11.

When the voltage value Vb of each single cell 11 decreases with an elimination of the polarization, the voltage value Vb may decrease below the threshold V_th. Particularly, as the voltage variation ΔVb increases, the voltage value Vb after the polarization has been eliminated tends to decrease below the threshold V_th.

The voltage variation ΔVb is expressed by the product of the current value flowing through the single cell 11 and the internal resistance of the single cell 11. Therefore, as the current value (charging current) flowing through the single cell 11 increases, the voltage variation ΔVb increases. In addition, as the internal resistance of the single cell 11 increases, the voltage variation ΔVb increases. Here, as the temperature of the single cell 11 decreases, the internal resistance of the single cell 11 tends to increase.

When the voltage value Vb of any one of the single cells 11 becomes lower than the threshold V_th with an elimination of the polarization, the alarm signal is output from the alarm setting circuit 63, and the transistor 68 switches from the off state to the on state. Thus, energization of the exciting coils 51 is allowed, and the system main relays SMR-B, SMR-G, SMR-P switch from the off state to the on state.

If the system main relays SMR-B, SMR-G, SMR-P switch from the off state to the on state, the battery pack 10 (single cells 11) resumes being charged or discharged, and the voltage value Vb of any one of the single cells 11 may become higher than the threshold V_th again. If the voltage value Vb becomes higher than the threshold V_th, the system main relays SMR-B, SMR-G, SMR-P are caused to switch from the on state to the off state by the current interruption circuit 60 as described above.

According to the above-described behavior of the voltage value Vb, the system main relays SMR-B, SMR-G, SMR-P repeatedly switch between the on state and the off state. In this way, if the system main relays SMR-B, SMR-G, SMR-P repeatedly switch between the on state and the off state, abrasion degradation of the system main relays SMR-B, SMR-G, SMR-P advances.

Figure 9:
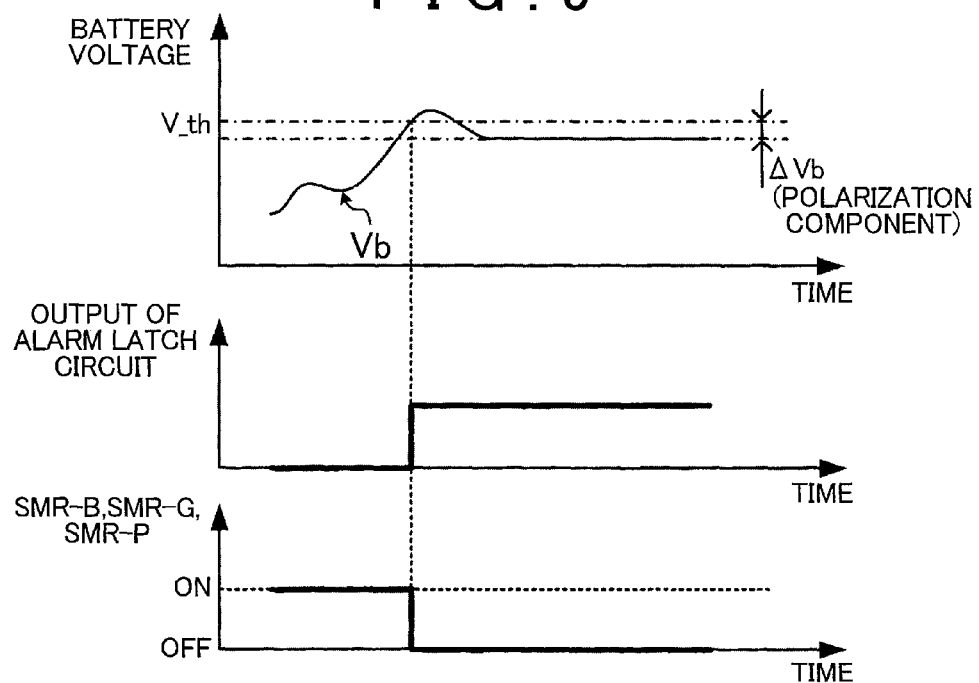
FIG. 9 is a graph that shows an output of the alarm latch circuit and operation of each system main relay in a configuration that the alarm latch circuit is provided.

In the present embodiment, the alarm latch circuit 64 is provided, so, when the alarm signal is output from the alarm setting circuit 63, the alarm signal is retained by the alarm latch circuit 64 as shown in FIG. 9. When the alarm signal is retained, the system main relays SMR-B, SMR-G, SMR-P remain in the off state.

Thus, it is possible to prevent the system main relays SMR-B, SMR-G, SMR-P from repeatedly switching between the on state and the off state due to the behavior of the voltage value Vb, shown in FIG. 8. Here, the system main relays SMR-B, SMR-G, SMR-P remain in the off state, so the voltage value Vb of each single cell 11 is kept in a state where the voltage value Vb is decreased by the voltage variation ΔVb. In other words, the voltage value Vb of each single cell 11 is kept at the open-circuit voltage.

Figure 10:
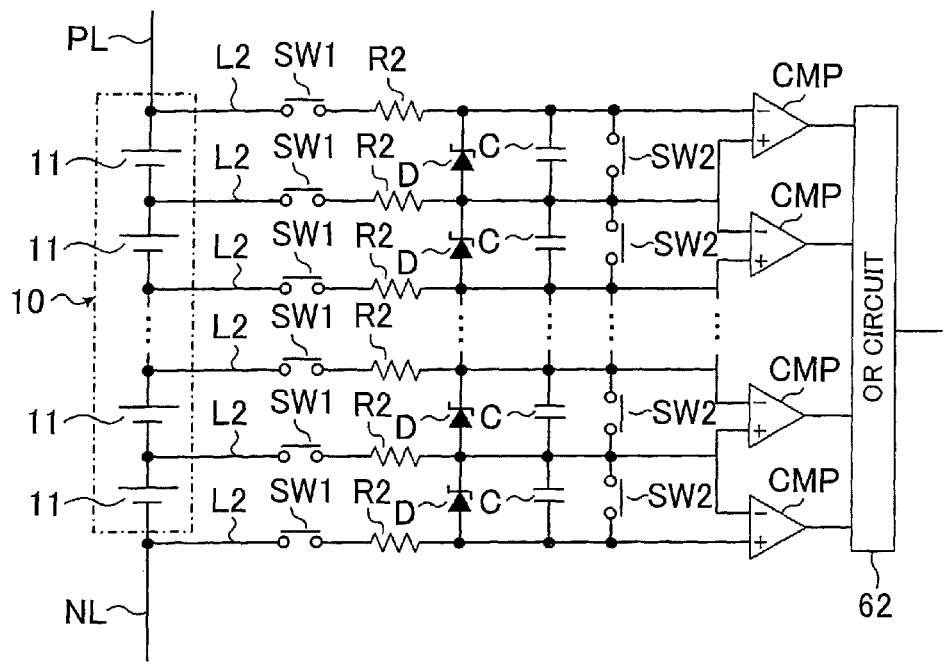
FIG. 10 is a view that shows the configuration of part of the current interruption circuit according to a first embodiment.

Next, a configuration of determining whether the current interruption circuit 60 is in an abnormal state will be described with reference to FIG. 10. FIG. 10 is a view that shows the configuration of part of the current interruption circuit 60. Switches SW1, SW2 (described later) are added to the configuration shown in FIG. 5 in order to determine whether the current interruption circuit 60 is in the abnormal state. Here, the abnormal state indicates a state where the current interruption circuit 60 is not operating normally.

Each switch SW1 is provided in a corresponding one of the voltage detection lines L2. Specifically, each switch SW1 is provided between the electrode terminal (positive electrode terminal or negative electrode terminal) of the corresponding single cell 11 and the corresponding resistor R2. Here, the plurality of switches SW1 may be formed of a multiplexer. Each switch SW1 switches between an on state and an off state upon reception of a control signal from the battery ECU 30.

Each switch SW2 is electrically connected in parallel with the corresponding single cell 11 via the corresponding two voltage detection lines L2. That is, each switch SW2 is provided in a bypass circuit electrically connected in parallel with the corresponding capacitor C. Each switch SW2 switches between an on state and an off state upon reception of a control signal from the battery ECU 30.

A connection point of each switch SW2 with one of the corresponding two voltage detection lines L2 is located between a connection point of the corresponding capacitor C with the one of the corresponding two voltage detection lines L2 and the corresponding comparator CMP. In addition, a connection point of each switch SW2 with the other one of the corresponding two voltage detection lines L2 is located between a connection point of the corresponding capacitor C with the other one of the corresponding two voltage detection lines L2 and the corresponding comparator CMP.

Figure 11:
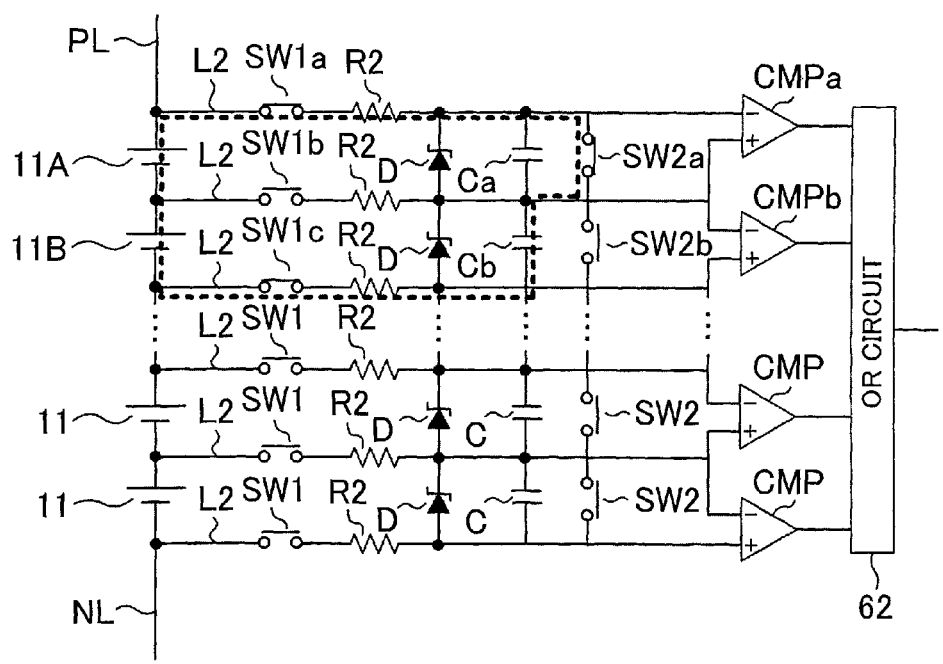
FIG. 11 is a view that shows the configuration of the part of the current interruption circuit according to the first embodiment.

As shown in FIG. 11, when the battery ECU 30 causes only the switches SW1a, SW1c, SW2a from the off state to the on state, the capacitor Cb corresponding to the single cell 11B is charged with electric charge in the single cells 11A, 11B along a path indicated by the dashed line in FIG. 11. That is, the voltage value of the capacitor Cb becomes equal to a terminal voltage of both the single cells 11A, 11B. Thus, the comparator CMPb outputs the voltage value of the capacitor Cb.

As described with reference to FIG. 6 or FIG. 7, the alarm setting circuit 63 compares the voltage value of the capacitor Cb with the threshold (voltage value) V_th. Here, the voltage value of the capacitor Cb is not the voltage value of the single cell 11B shown in FIG. 11 but the voltage value of both the single cells 11A, 11B, so the voltage value of the capacitor Cb tends to be higher than the threshold (voltage value) V_th. When the voltage value of the capacitor Cb is higher than the threshold (voltage value) V_th, the alarm setting circuit 63 outputs the alarm signal indicating that the corresponding single cell 11 is in the overcharged state. The alarm signal is used to determine whether the current interruption circuit 60 is in the abnormal state.

When the alarm setting circuit 63 outputs the alarm signal, the system main relays SMR-B, SMR-G switch from the on state to the off state, and the charging or discharging operation of the battery pack 10 is stopped as described above. When the charging or discharging operation of the battery pack 10 is stopped, the voltage value input to the inverter 22 becomes 0 [V] or the current value flowing through the battery pack 10 becomes 0 [A].

In the example shown in FIG. 11, the voltage value of the capacitor Cb is the voltage value of the two single cells 11A, 11B; however, the invention is not limited to this configuration. That is, it is applicable that, when the single capacitor C is charged with electric charge in the three or more single cells 11 electrically connected in series with one another, the voltage value of the single capacitor C is the voltage value of the three or more single cells 11. When the single capacitor C is charged with electric charge in the three or more single cells 11 as well, the on/off state of each of the switches SW1, SW2 just needs to be controlled as in the case of the example shown in FIG. 11.

Here, the number of the single cells 11 by which each capacitor C is charged with electric charge may be set as needed in consideration of the withstanding voltage of each capacitor C. That is, the number of the single cells 11 may be set such that the voltage value of a plurality of the single cells 11 by which each capacitor C is charged with electric charge does not exceed the withstanding voltage of each capacitor C.

After the battery pack 10 is discharged, the voltage value of each single cell 11 is decreased, so the number of the single cells 11 by which each capacitor C is charged with electric charge may be set on the basis of the voltage value of each single cell 11, detected by the battery ECU 30. Specifically, as the voltage value of each single cell 11 decreases, the number of the single cells 11 by which the single capacitor C is charged with electric charge may be increased. Thus, it is possible to set the voltage value input to the alarm setting circuit 63 such that the input voltage value is higher than the threshold (voltage value) V_th, so it is possible to cause the alarm setting circuit 63 to output the alarm signal.

Figure 12:
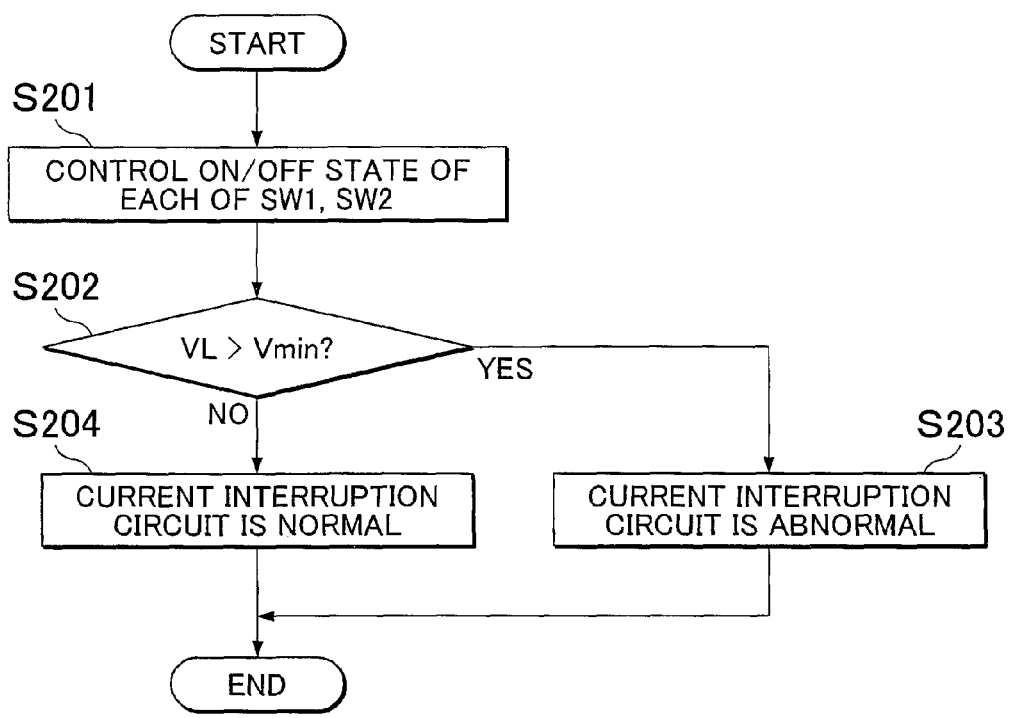
FIG. 12 is a flowchart that shows the process of determining whether the current interruption circuit is in an abnormal state according to the first embodiment.

Next, the process of determining whether the current interruption circuit 60 is in the abnormal state will be described with reference to the flowchart shown in FIG. 12. The process shown in FIG. 12 is executed by the battery ECU 30.

In step S201, the battery ECU 30 controls the on/off state of each of the plurality of switches SW1, SW2 shown in FIG. 10. For example, as shown in FIG. 11, when the capacitor Cb is charged with electric charge in the two single cells 11A, 11B, the battery ECU 30 causes only the switches SW1a, SW1c, SW2a to switch from the off state to the on state. Here, the switches SW1, SW2 other than the switches SW1a, SW1c, SW2a are caused to remain in the off state.

When the process of step S201 is executed, as described with reference to FIG. 11, the voltage value of the capacitor Cb becomes equal to the voltage value of both the single cells 11A, 11B, and becomes higher than the threshold (voltage value) V_th that is compared in the alarm setting circuit 63. Thus, the alarm setting circuit 63 outputs the alarm signal, and causes the system main relays SMR-B, SMR-G, SMR-P to switch from the on state to the off state. Accordingly, the charging or discharging operation of the battery pack 10 is stopped.

In step S202, the battery ECU 30 detects the voltage value VL input to the inverter 22 with the use of the voltage sensor 24. The battery ECU 30 determines whether the voltage value VL is higher than a threshold (voltage value) Vmin. The threshold Vmin is a value for determining whether the charging or discharging operation of the battery pack 10 is stopped. Information about the threshold Vmin may be stored in the memory.

The charging or discharging operation of the battery pack 10 is stopped through the process of step S201, so the voltage value input to the inverter 22 is 0 [V]. Therefore, the threshold Vmin may be, for example, set to 0 [V]. The threshold Vmin may be set to a value higher than 0 [V] in consideration of a detection error of the voltage sensor 24.

When the voltage value VL is higher than the threshold Vmin in step S202, the battery ECU 30 executes the process of step S203. On the other hand, when the voltage value VL is lower than or equal to the threshold Vmin, the battery ECU 30 executes the process of step S204.

In step S203, the battery ECU 30 determines that the current interruption circuit 60 is in the abnormal state. When the current interruption circuit 60 is operating normally, the alarm signal is output from the alarm setting circuit 63, and the charging or discharging operation of the battery pack 10 is stopped as described above.

On the other hand, when the current interruption circuit 60 is in the abnormal state, the alarm setting circuit 63 may not be caused to output the alarm signal or the output signal of the alarm latch circuit 64 may not be input to the transistor 68. In this case, the system main relays SMR-B, SMR-G do not switch from the on state to the off state, and the charging or discharging operation of the battery pack 10 is continued.

When the charging or discharging operation of the battery pack 10 is continued, the voltage value VL becomes higher than the threshold Vmin. In this case, the battery ECU 30 is allowed to determine that the charging or discharging operation of the battery pack 10 is not stopped irrespective of a situation that control for intentionally outputting the alarm signal is being executed. Thus, the battery ECU 30 is allowed to determine that the current interruption circuit 60 is in the abnormal state.

In step S204, the battery ECU 30 determines that the current interruption circuit 60 is in a normal state. When the voltage value VL is lower than or equal to the threshold Vmin, the charging or discharging operation of the battery pack 10 is stopped, so the battery ECU 30 is allowed to determine that the current interruption circuit 60 is operating normally. That is, the battery ECU 30 is allowed to determine that the system main relays SMR-B, SMR-G, SMR-P are caused to switch from the on state to the off state in response to the intentionally generated alarm signal.

In the process shown in FIG. 12, it is determined whether the current interruption circuit 60 is in the abnormal state on the basis of the output signal of the voltage sensor 24; however, the invention is not limited to this configuration. As described above, when the system main relays SMR-B, SMR-G, SMR-P switch from the on state to the off state in response to the alarm signal output from the current interruption circuit 60, no current flows through the battery pack 10. Therefore, it is possible to determine whether the current interruption circuit 60 is in the abnormal state on the basis of the output signal of the current sensor 21.

Figure 13:
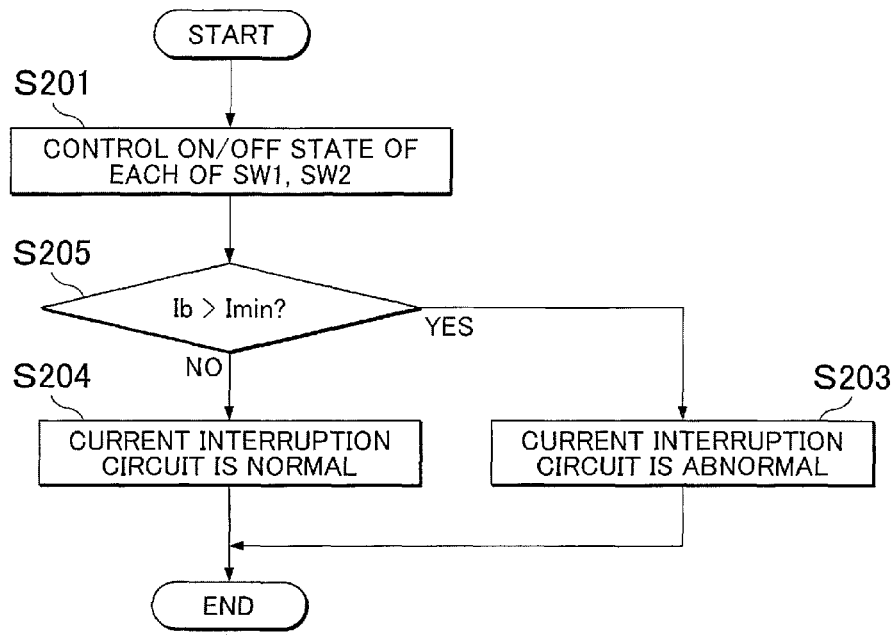
FIG. 13 is a flowchart that shows the process of determining whether the current interruption circuit is in an abnormal state according to an alternative embodiment to the first embodiment.

Specifically, by executing the process shown in FIG. 13, it is possible to determine whether the current interruption circuit 60 is in the abnormal state. In FIG. 13, like reference numerals denote the same processes as those described in FIG. 12. In the processes shown in FIG. 13, the process of step S205 is executed instead of the process of step S202 shown in FIG. 12.

In step S205, the battery ECU 30 detects the current value Ib flowing through the battery pack 10 with the use of the current sensor 21. The battery ECU 30 determines whether the current value Ib is larger than a threshold Imin. The threshold Imin is a value for determining whether the charging or discharging operation of the battery pack 10 is stopped. Information about the threshold Imin may be stored in the memory.

The charging or discharging operation of the battery pack 10 is stopped through the process of step S201, so no current flows through the battery pack 10. Therefore, the threshold Imin may be, for example, set to 0 [A]. The threshold Imin may be set to a value different from 0 [A] in consideration of a detection error of the current sensor 21.

As described above, when the battery pack 10 is being discharged, the current value Ib detected by the current sensor 21 is a positive value; whereas, when the battery pack 10 is being charged, the current value Ib detected by the current sensor 21 is a negative value. Therefore, in the process of step S205, when the current value Ib is compared with the threshold Imin, the absolute values of these values are desirably compared with each other.

When the current value Ib is larger than the threshold Imin in step S205, the battery ECU 30 executes the process of step S203. On the other hand, when the current value Ib is smaller than or equal to the threshold Imin, the battery ECU 30 executes the process of step S204.

In the present embodiment, by controlling the on/off state of each of the switches SW1, SW2 shown in FIG. 10, the alarm setting circuit 63 is caused to determine that there is overcharging; however, the invention is not limited to this configuration. Specifically, in the alarm setting circuit 63 shown in FIG. 6 or FIG. 7, by changing a reference voltage (threshold V_th) input to the comparator 63a, the alarm setting circuit 63 may be caused to determine that there is overcharging.

Figure 14:
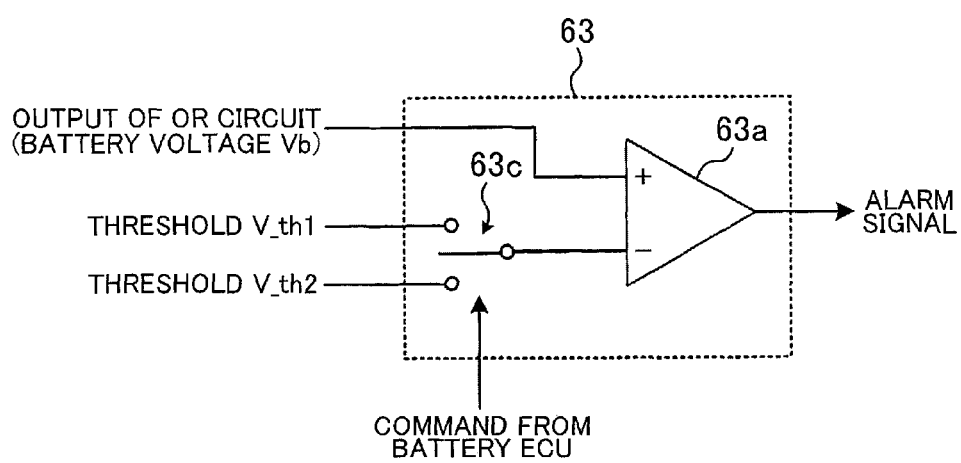
FIG. 14 is a view that shows the configuration of an alarm setting circuit according to an alternative embodiment to the first embodiment.

Specifically, as shown in FIG. 14, a switch 63c is connected to the negative input terminal of the comparator 63a, and it is possible to change the reference voltage input to the comparator 63a by switching the switch 63c. Specifically, a threshold V_th1 or a threshold V_th2 may be input to the comparator 63a as the reference voltage.

The battery ECU 30 is able to execute drive control over the switch 63c. The threshold V_th1 is used to determine whether any one of the single cells 11 is in the overcharged state. That is, the threshold V_th1 is the same as the threshold V_th shown in FIG. 6 or FIG. 7. When it is determined whether any one of the single cells 11 is in the overcharged state with the use of the current interruption circuit 60 while the battery pack 10 is being charged or discharged, the battery ECU 30 executes drive control over the switch 63c and causes the threshold V_th1 to be input to the comparator 63a.

On the other hand, the threshold V_th2 is used to determine whether the current interruption circuit 60 is in the abnormal state. The threshold V_th2 is a value lower than the threshold V_th1. When it is determined whether the current interruption circuit 60 is in the abnormal state, the battery ECU 30 executes drive control over the switch 63c and causes the threshold V_th2 to be input to the comparator 63a.

Because the threshold V_th2 is lower than the threshold V_th1, the voltage value Vb of any one of the single cells 11, input to the comparator 63a, tends to be higher than the threshold V_th2. Therefore, when the threshold V_th2 is input to the comparator 63a, the alarm signal is output from the alarm setting circuit 63. It is possible to cause the system main relays SMR-B, SMR-G, SMR-P to switch from the on state to the off state in response to the alarm signal, and it is possible to determine whether the current interruption circuit 60 is in the abnormal state through the process shown in FIG. 12 or FIG. 13.

In the configuration shown in FIG. 14, the reference voltage input to the comparator 63a is changed; however, the invention is not limited to this configuration. Specifically, as shown in FIG. 15, a voltage value input to the positive input terminal of the comparator 63a may be changed without changing the reference voltage (threshold V_th) input to the negative input terminal of the comparator 63a.

Figure 15:
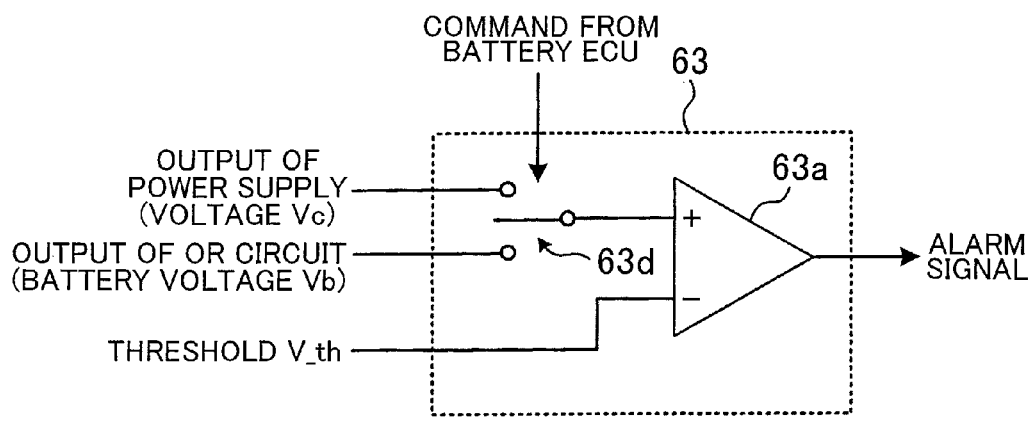
FIG. 15 is a view that shows the configuration of an alarm setting circuit according to another alternative embodiment to the first embodiment.

In the configuration shown in FIG. 15, a switch 63d is connected to the positive input terminal of the comparator 63a. The switch 63d operates upon reception of a control signal from the battery ECU 30. The switch 63d inputs the voltage value Vb of any one of the single cells 11 to the comparator 63a or inputs a voltage value Vc from a power supply to the comparator 63a. The power supply may be, for example, a stabilized power supply.

The voltage value Vc is a value higher than the threshold V_th, and may be set as needed. When the voltage value Vc is input to the comparator 63a, the voltage value Vc is higher than the threshold V_th, so the alarm setting circuit 63 outputs the alarm signal. Thus, when it is determined whether the current interruption circuit 60 is in the abnormal state, the battery ECU 30 is able to cause the voltage value Vc to be input to the comparator 63a by executing drive control over the switch 63d. Through the process shown in FIG. 12 or FIG. 13, it is possible to determine whether the current interruption circuit 60 is in the abnormal state.

When the current interruption circuit 60 determines whether any one of the single cells 11 is in the overcharged state while the battery pack 10 is being charged or discharged, the battery ECU 30 is able to cause the voltage value Vb of the any one of the single cells 11 to be input to the comparator 63a by executing drive control over the switch 63d. Thus, when any one of the single cells 11 is in the overcharged state, it is possible to cause the system main relays SMR-B, SMR-G, SMR-P to switch from the on state to the off state in response to the alarm signal output from the current interruption circuit 60.

According to the present embodiment, even when each single cell 11 is not in the overcharged state, it is possible to cause the current interruption circuit 60 to determine that any one of the single cells 11 is in the overcharged state on the basis of a command output from the battery ECU 30. In other words, even when each single cell 11 is not in the overcharged state, it is possible to cause the current interruption circuit 60 to output the alarm signal. Thus, it is possible to check whether the alarm signal is normally output from the current interruption circuit 60, so it is possible to determine whether the current interruption circuit 60 is in the abnormal state.

As described above, in order to determine whether the current interruption circuit 60 is in the abnormal state, initially, the system main relays SMR-B, SMR-G, SMR-P are turned on. Then, the current interruption circuit 60 is caused to output the alarm signal, and it is confirmed that the system main relays SMR-B, SMR-G, SMR-P have switched from the on state to the off state, in other words, the battery pack 10 is not being charged or discharged. Here, when the charging or discharging operation of the battery pack 10 is continued, it may be determined that the current interruption circuit 60 is in the abnormal state. On the other hand, when the charging or discharging operation of the battery pack 10 is stopped, it may be determined that the current interruption circuit 60 is in the normal state. After it is determined that the current interruption circuit 60 is in the abnormal state, it is possible to cause the system main relays SMR-B, SMR-G, SMR-P to switch into the off state.

In this way, in order to determine whether the current interruption circuit 60 is in the abnormal state, it is required to turn on or turn off the system main relays SMR-B, SMR-G, SMR-P. Therefore, in order to determine whether the current interruption circuit 60 is in the abnormal state, the system main relays SMR-B, SMR-G, SMR-P must be operated. If the number of times the system main relays SMR-B, SMR-G, SMR-P are operated increases, abrasion degradation of the system main relays SMR-B, SMR-G, SMR-P is advanced.

Therefore, a method of suppressing an increase in the number of times the system main relays SMR-B, SMR-G, SMR-P are operated even when it is determined whether the current interruption circuit 60 is in the abnormal state will be described below.

Figure 16:
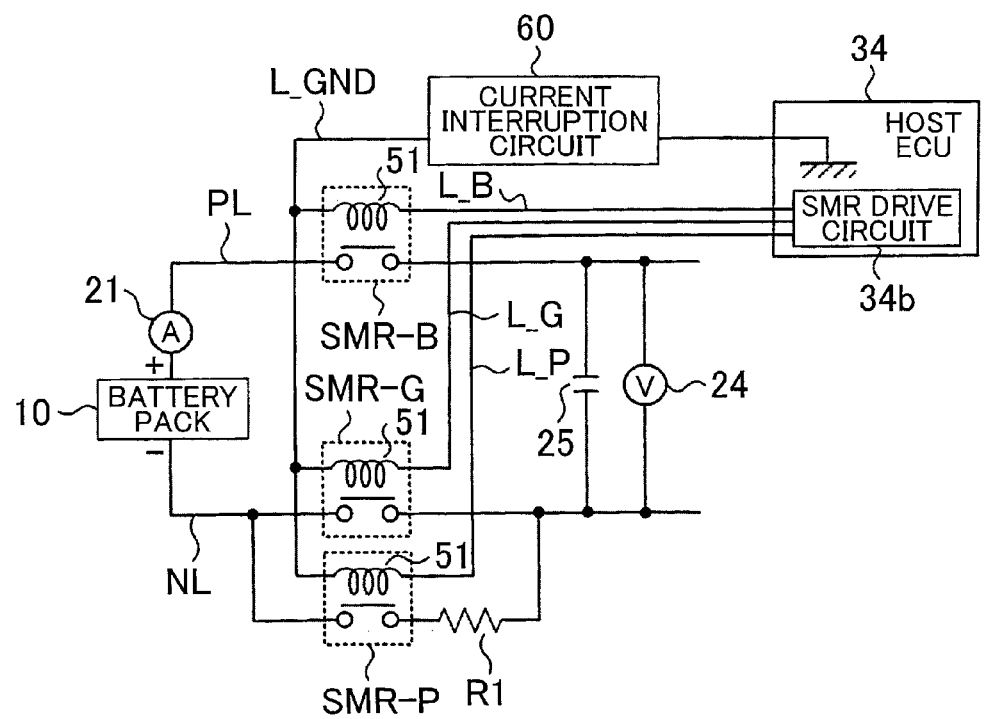
FIG. 16 is a view that illustrates a location at which the current interruption circuit is provided in the configuration of part of the battery system.

FIG. 16 is a view that shows the configuration of part of the battery system according to the present embodiment. One end of the exciting coil 51 in the system main relay SMR-B is grounded via a ground line L_GND. The other end of the exciting coil 51 in the system main relay SMR-B is connected to an SMR drive circuit 34b via a drive line L_B. The SMR drive circuit 34b is included in the host ECU 34, and controls energization and non-energization of the exciting coil 51.

When current is caused to flow through the exciting coil 51 by the operation of the SMR drive circuit 34b, it is possible to cause the system main relay SMR-B to switch from the off state to the on state. When energization of the exciting coil 51 is interrupted through the operation of the SMR drive circuit 34b, it is possible to cause the system main relay SMR-B to switch from the on state to the off state.

The system main relays SMR-G, SMR-P also have a similar configuration to that of the system main relay SMR-B. That is, one end of the exciting coil 51 of each of the system main relays SMR-G, SMR-P is grounded via the ground line L_GND. In addition, the other end of the exciting coil 51 of each of the system main relays SMR-G, SMR-P is connected to the SMR drive circuit 34b via a corresponding drive line L_G or drive line L_P.

The SMR drive circuit 34b is able to control energization of the exciting coil 51 of each of the system main relays SMR-G, SMR-P and cause each of the system main relays SMR-G, SMR-P to switch between the on state and the off state. Here, the SMR drive circuit 34b is able to independently control energization and non-energization of the exciting coil 51 of each of the system main relays SMR-B, SMR-G, SMR-P.

The exciting coils 51 of the system main relays SMR-B, SMR-G, SMR-P are grounded via the common ground line L_GND. Therefore, in comparison with the case where the ground line L_GND is individually provided for each of the exciting coils 51 of the system main relays SMR-B, SMR-G, SMR-P, it is possible to reduce the number of the ground lines L_GND. The ground line L_GND may be individually provided for each exciting coil 51.

The current interruption circuit 60 is provided in the ground line L_GND. As described above, when the alarm signal is output from the current interruption circuit 60, energization of the exciting coils 51 is interrupted, so the system main relays SMR-B, SMR-G, SMR-P switch from the on state to the off state. When the alarm signal is output from the current interruption circuit 60, the system main relays SMR-B, SMR-G, SMR-P do not switch into the on state even when the SMR drive circuit 34b attempts to turn on the system main relays SMR-B, SMR-G, SMR-P.

Figure 17:
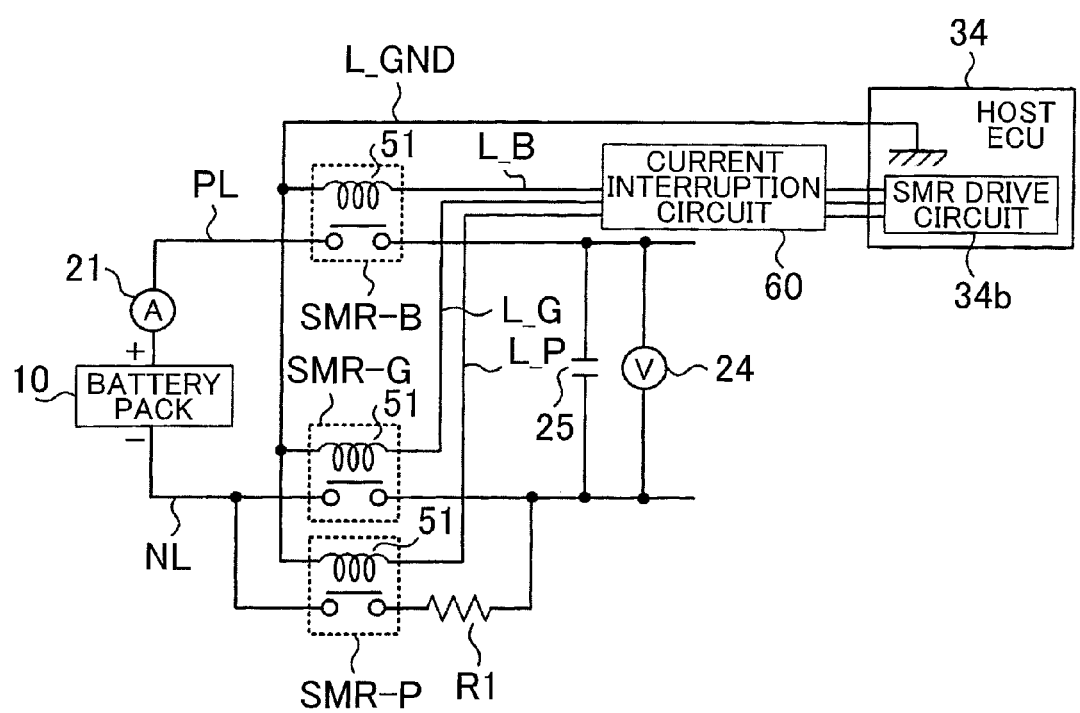
FIG. 17 is a view that illustrates a location at which the current interruption circuit is provided in the configuration of part of the battery system.

In the configuration shown in FIG. 16, the current interruption circuit 60 is provided in the ground line L_GND; however, the invention is not limited to this configuration. Specifically, as shown in FIG. 17, the current interruption circuit 60 may be provided in the drive lines L_B, L_G, L_P. Even with the configuration shown in FIG. 17, when the alarm signal is output from the current interruption circuit 60, it is possible to interrupt energization of the exciting coil 51 of each of the system main relays SMR-B, SMR-G, SMR-P. In addition, when no alarm signal is output from the current interruption circuit 60, the exciting coil 51 of each of the system main relays SMR-B, SMR-G, SMR-P switches between energization and non-energization in response to drive control executed by the SMR drive circuit 34b.

Next, the process of causing the battery system shown in FIG. 1 to enter the start-up state (ready-on state) will be described with reference to the flowchart shown in FIG. 18. The process shown in FIG. 18 is executed by the host ECU 34.

Figure 18:
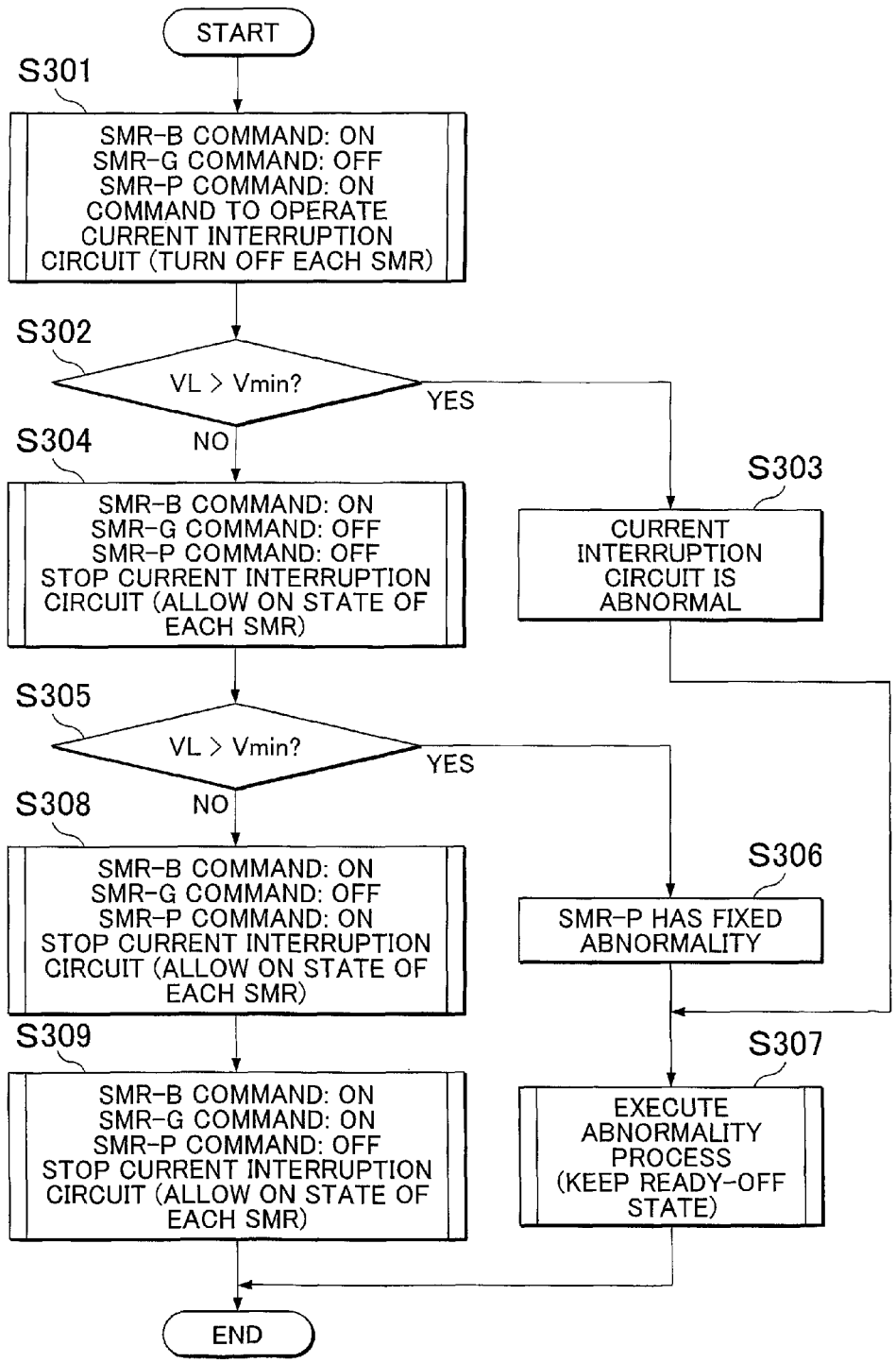
FIG. 18 is a flowchart that shows a process that is executed at the time of causing the battery system to enter a start-up state (ready-on state)

In addition, the process shown in FIG. 18 is started at the time when the ignition switch switches from the off state to the on state. Before the process shown in FIG. 18 is started, the battery system is in the stopped state (ready-off state), and the system main relays SMR-B, SMR-G, SMR-P are in the off state.

In step S301, when the host ECU 34 (SMR drive circuit 34b) has received information about the on state of the ignition switch, the current interruption circuit 60 is initially caused to output the alarm signal. The process of causing the current interruption circuit 60 to output the alarm signal is described above.

In addition, in step S301, after the host ECU 34 executes the process of outputting the alarm signal, the host ECU 34 causes the system main relays SMR-B, SMR-P to switch from the off state to the on state. Specifically, the SMR drive circuit 34b executes the process of causing current to flow through the exciting coil 51 of each of the system main relays SMR-B, SMR-P. Here, the host ECU 34 causes the system main relay SMR-G to remain in the off state.

As described above, when the current interruption circuit 60 is in the normal state, no current flows through the exciting coils 51 even when the SMR drive circuit 34b attempts to cause current to flow through the exciting coil 51 of each of the system main relays SMR-B, SMR-P. That is, the system main relays SMR-B, SMR-P do not switch from the off state to the on state. On the other hand, when the current interruption circuit 60 is in the abnormal state, current flows through the exciting coil 51 of each of the system main relays SMR-B, SMR-P, and the system main relays SMR-B, SMR-P switch from the off state to the on state.

In step S302, the host ECU 34 detects the voltage value VL, input to the inverter 22, with the use of the voltage sensor 24. The host ECU 34 determines whether the voltage value VL is higher than the threshold (voltage value) Vmin. The threshold Vmin is the same as the threshold Vmin described in the process of step S202 shown in FIG. 12.

In the process of step S301, the process of causing the current interruption circuit 60 to output the alarm signal is executed, so, when the current interruption circuit 60 is in the normal state, the system main relays SMR-B, SMR-P do not switch into the on state even when the SMR drive circuit 34b attempts to turn on the system main relays SMR-B, SMR-P. In other words, the battery pack 10 is not charged or discharged. Thus, the voltage value VL becomes lower than or equal to the threshold Vmin.

On the other hand, when the current interruption circuit 60 is in the abnormal state, no alarm signal is output from the current interruption circuit 60, so the system main relays SMR-B, SMR-P switch from the off state to the on state through the operation of the SMR drive circuit 34b. Thus, the battery pack 10 is connected to the load (the inverter 22 shown in FIG. 1), and the battery pack 10 is charged or discharged. Thus, the voltage value VL becomes higher than the threshold Vmin.

When the voltage value VL is higher than the threshold Vmin in step S302, the host ECU 34 executes the process of step S303. On the other hand, when the voltage value VL is lower than or equal to the threshold Vmin, the host ECU 34 executes the process of step S304.

In step S303, the host ECU 34 determines that the current interruption circuit 60 is in the abnormal state. After the process of step S303 is executed, the host ECU 34 executes the process of step S307. The process of step S303 is similar to the process of step S203 shown in FIG. 12. When the process proceeds from step S302 to step S304, the host ECU 34 is allowed to confirm that the current interruption circuit 60 is in the normal state.

In step S304, the host ECU 34 stops the process of causing the current interruption circuit 60 to output the alarm signal. In addition, the host ECU 34 executes the process of causing the system main relay SMR-P to switch from the on state to the off state. Here, the host ECU 34 causes the system main relay SMR-B to remain in the on state, and causes the system main relay SMR-G to remain in the off state.

When the current interruption circuit 60 is in the normal state, the system main relay SMR-B switches from the off state to the on state as a result of stopping the process of outputting the alarm signal. That is, through the process of step S301, the SMR drive circuit 34b continues allowing energization of the exciting coil 51 of the system main relay SMR-B, so, when no alarm signal is output from the current interruption circuit 60, the system main relay SMR-B switches from the off state to the on state.

When the alarm signal is output from the current interruption circuit 60 in the normal state, no current flows through the exciting coil 51 of the system main relay SMR-P even when the SMR drive circuit 34b allows energization of the exciting coil 51 of the system main relay SMR-P. Therefore, when the current interruption circuit 60 is in the normal state, the system main relay SMR-P does not switch from the off state to the on state in the processes from step S301 to step S304.

In step S305, the host ECU 34 detects the voltage value VL, input to the inverter 22, with the use of the voltage sensor 24. The host ECU 34 determines whether the voltage value VL is higher than the threshold (voltage value) Vmin. The threshold Vmin is the same as the threshold Vmin described in the process of step S302. When the voltage value VL is higher than the threshold Vmin, the host ECU 34 executes the process of step S306; whereas, when the voltage value VL is lower than or equal to the threshold Vmin, the host ECU 34 executes the process of step S308.

In the process of step S304, only the system main relay SMR-B is in the on state. In this state, when the voltage value VL is higher than the threshold Vmin, it may be determined that the battery pack 10 is connected to the load (inverter 22). In the processes of step S301 to step S304, the system main relay SMR-G remains in the off state. On the other hand, in the processes of step S301 to step S304, the system main relay SMR-P is caused to switch between the on state and the off state.

Therefore, when the voltage value VL is higher than the threshold Vmin, it may be determined that the system main relay SMR-P is fixed through the process of step S301. Therefore, in step S306, the host ECU 34 determines that the system main relay SMR-P is fixed and in the abnormal state. After the process of step S306 is executed, the host ECU 34 executes the process of step S307.

In step S307, the host ECU 34 alarms that the battery system has an abnormality. The abnormality here includes the abnormal state of the current interruption circuit 60, determined in the process of step S303, or the abnormal state of the system main relay SMR-P, determined in the process of step S306. Here, when the battery system has an abnormality, the host ECU 34 is able to not allow a start-up of the battery system. That is, when the battery system has an abnormality, the battery system is allowed to remain in the stopped state (ready-off state).

The alarm about the abnormality may be issued to a user, or the like. In addition, a method of issuing an alarm may be any method by which the user, or the like, can recognize the alarm and may be, for example, issuing an alarm by a sound or indication. In the alarm using a sound, a sound indicating the alarm may be output from a speaker. In addition, in the alarm using an indication, information indicating the alarm may be shown on a display. By issuing such an alarm, the user, or the like, can recognize that the battery system has an abnormality, so measures, such as inspection at a dealer, may be taken.

In step S308, the host ECU 34 executes the process of causing the system main relay SMR-P to switch from the off state to the on state. Specifically, the SMR drive circuit 34b causes current to flow through the exciting coil 51 of the system main relay SMR-P. Here, because no alarm signal is output from the current interruption circuit 50, the system main relay SMR-P switches from the off state to the on state through the operation of the SMR drive circuit 34b.

Through the process of step S304, the system main relay SMR-B has switched from the off state to the on state. Therefore, by causing the system main relay SMR-P to switch from the off state to the on state through the process of step S308, the battery pack 10 is connected to the load (inverter 22).

Here, discharging current of the battery pack 10 flows to the capacitor 25 via the current limiting resistor R1, and the capacitor 25 is charged. By causing the discharging current to flow through the current limiting resistor R1, it is possible to suppress flow of inrush current to the capacitor 25. As the capacitor 25 is charged, the voltage value VL detected by the voltage sensor 24 increases. When the charging operation of the capacitor 25 is completed, the voltage value of the capacitor 25, in other words, the voltage value VL detected by the voltage sensor 24, becomes equal to the voltage value of the battery pack 10.

In step S309, the host ECU 34 executes the process of causing the system main relay SMR-P to switch from the on state to the off state, and executes the process of causing the system main relay SMR-G to switch from the off state to the on state. Specifically, the SMR drive circuit 34b interrupts energization of the exciting coil 51 of the system main relay SMR-P, and causes current to flow through the exciting coil 51 of the system main relay SMR-G.

Here, the process of step S309 is executed after the charging operation of the capacitor 25 has been completed. When the process of step S309 ends, the battery system enters the start-up state (ready-on state), and the process shown in FIG. 18 ends.

Figure 19:
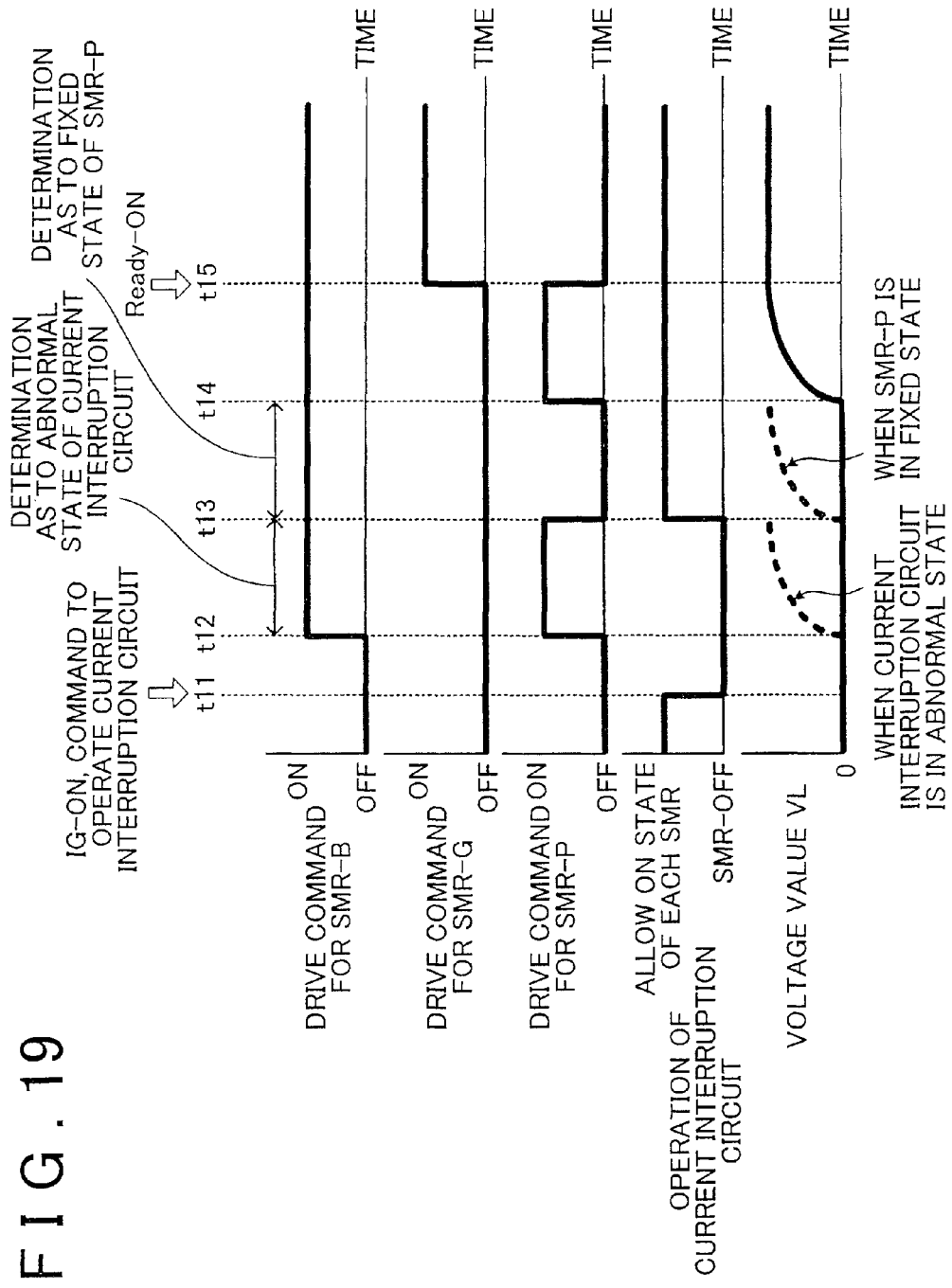
FIG. 19 is a timing chart that shows drive commands for the system main relays and the operation of the current interruption circuit at the time of causing the battery system to enter the start-up state (ready-on state)

FIG. 19 shows drive commands for the system main relays SMR-B, SMR-G, SMR-P and the operation of the current interruption circuit 60 at the time when the process shown in FIG. 18 is executed. Here, the drive commands for the SMR-B, SMR-G, SMR-P indicate the operation of the SMR drive circuit 34b, and do not indicate the actual operations of the system main relays SMR-B, SMR-G, SMR-P.

As described in the process of step S301, when information about the on state of the ignition switch is input to the host ECU 34, the process of causing the current interruption circuit 60 to output the alarm signal is started at time t11. At time t12, the process of causing the system main relays SMR-B, SMR-P to switch from the off state to the on state is executed.

In the present embodiment, the process of causing the current interruption circuit 60 to output the alarm signal and the process of causing the system main relays SMR-B, SMR-P to switch from the off state to the on state are executed at mutually different time t11 and time t12; however, the invention is not limited to this configuration. Specifically, the process of causing the current interruption circuit 60 to output the alarm signal and the process of causing the system main relays SMR-B, SMR-P to switch from the off state to the on state may be executed at the same time.

In the present embodiment, the process of causing the system main relays SMR-B, SMR-P to switch from the off state to the on state is executed at the same time t12; however, the invention is not limited to this configuration. Specifically, the process of causing the system main relay SMR-B to switch from the off state to the on state and the process of causing the system main relay SMR-P to switch from the off state to the on state may be executed at mutually different times. However, the process of causing the system main relays SMR-B, SMR-P to switch from the off state to the on state needs to be executed while the process of causing the current interruption circuit 60 to output the alarm signal is being executed.

When the current interruption circuit 60 is in the abnormal state, the battery pack 10 is connected to the load (inverter 22) as a result of switching of the system main relays SMR-B, SMR-P from the off state to the on state. Accordingly, as indicated by the dashed line in FIG. 19, the voltage value VL increases after time t12. By monitoring the behavior of the voltage value VL, it is possible to determine whether the current interruption circuit 60 is in the abnormal state.

At time t13, the process of step S304 shown in FIG. 18 is executed. That is, the process of causing the system main relay SMR-P to switch from the on state to the off state is executed, and the process of causing the current interruption circuit 60 to output the alarm signal is stopped. After time t13, only the system main relay SMR-B is in the on state; however, when the system main relay SMR-P is fixed in the on state, the voltage value VL increases as shown in the dashed line in FIG. 19. By monitoring the behavior of the voltage value VL, it is possible to determine whether the system main relay SMR-P is fixed.

In the present embodiment, the process of causing the system main relay SMR-P to switch from the on state to the off state and the process of stopping outputting the alarm signal are executed at the same time t13; however, the invention is not limited to this configuration. That is, the process of causing the system main relay SMR-P to switch from the on state to the off state and the process of stopping outputting the alarm signal may be executed at mutually different times. However, the process of causing the system main relay SMR-P to switch from the on state to the off state needs to be executed while the process of outputting the alarm signal is being executed, in other words, before the process of stopping outputting the alarm signal is executed.

At time t14, the process of step S308 shown in FIG. 18 is executed. After time t14, the system main relays SMR-B, SMR-P are in the on state, so the voltage value VL increases. At time t15, the process of step S309 shown in FIG. 18 is executed. After time t15, only the system main relays SMR-B, SMR-G are in the on state, and the battery system enters the start-up state (ready-on state).

In the present embodiment, the process of causing the system main relay SMR-P to switch from the on state to the off state and the process of causing the system main relay SMR-G to switch from the off state to the on state are executed at the same time t15; however, the invention is not limited to this configuration. Specifically, before the system main relay SMR-P is caused to switch from the on state to the off state, the system main relay SMR-G may be caused to switch from the off state to the on state.

Figure 20:
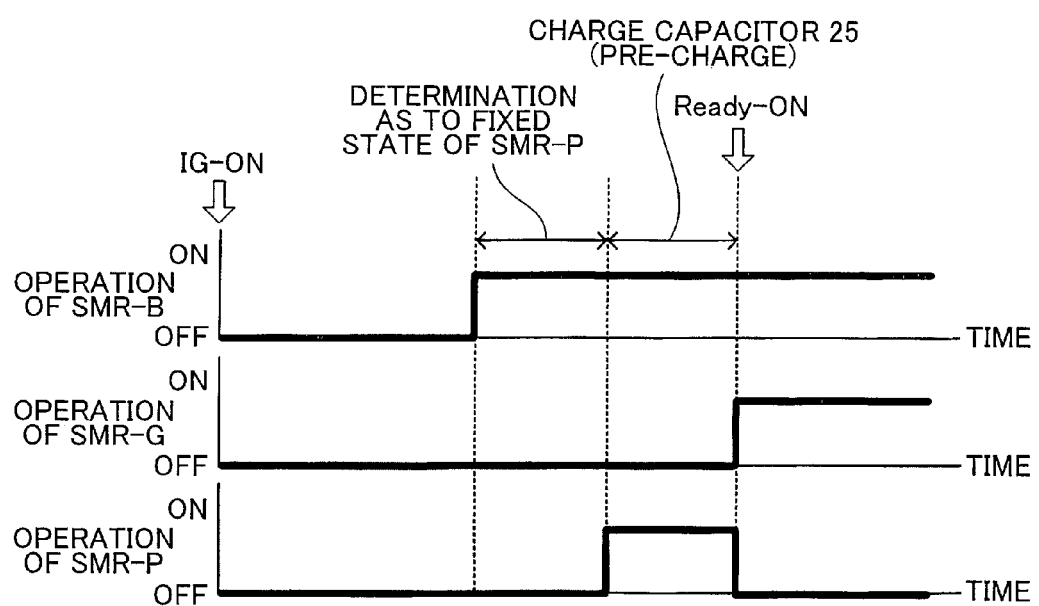
FIG. 20 is a timing chart that shows the operations of the system main relays at the time of causing the battery system to enter the start-up state (ready-on state) in the case where it is not determined whether the current interruption circuit is in an abnormal state.

When it is not determined whether the current interruption circuit 60 is in the abnormal state, it is possible to cause the system main relays SMR-B, SMR-G, SMR-P to operate as shown in FIG. 20. Here, the "operations of the SMR-B, SMR-G, SMR-P" shown in FIG. 20 indicate actual operations of the system main relays SMR-B, SMR-G, SMR-P.

As shown in FIG. 20, when the system main relays SMR-B, SMR-G, SMR-P are caused to operate, as in the case of the example described with reference to FIG. 19, it is possible to determine whether the system main relay SMR-P is in a fixed state, charge the capacitor 25 or cause the battery system to enter the start-up state (ready-on state).

Figure 21:
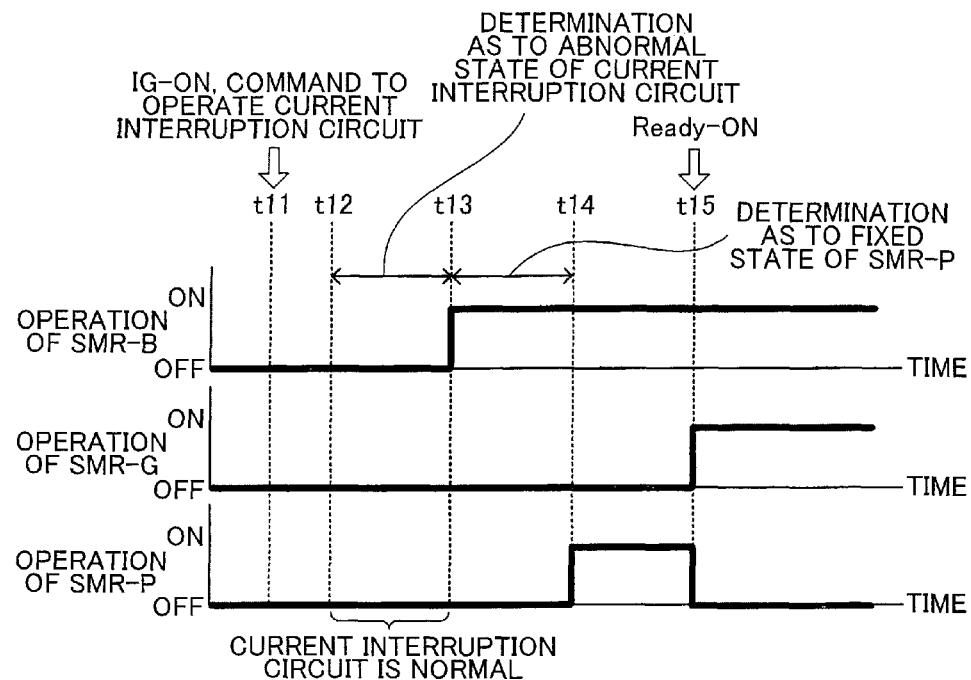
FIG. 21 is a timing chart that shows the operations of the system main relays at the time of causing the battery system to enter the start-up state (ready-on state) in the case where it is determined whether the current interruption circuit is in the abnormal state.

On the other hand, as described in the present embodiment, when it is determined whether the current interruption circuit 60 is in the abnormal state at the time of causing the battery system to enter the start-up state (ready-on state), the system main relays SMR-B, SMR-G, SMR-P operate as shown in FIG. 21. FIG. 21 is a graph that corresponds to FIG. 19. Here, the "operations of the SMR-B, SMR-G, SMR-P" shown in FIG. 21 indicate actual operations of the system main relays SMR-B, SMR-G, SMR-P. In addition, in FIG. 21, it is assumed that the current interruption circuit 60 is in the normal state.

As is apparent from comparison between FIG. 20 and FIG. 21, the number of times each of the system main relays SMR-B, SMR-G, SMR-P is operated is equal between when it is not determined whether the current interruption circuit 60 is in the abnormal state (FIG. 20) and when it is determined whether the current interruption circuit 60 is in the abnormal state (FIG. 21). That is, by executing the process shown in FIG. 18, the number of times each of the system main relays SMR-B, SMR-G, SMR-P is operated does not increase in order to determine whether the current interruption circuit 60 is in the abnormal state. Thus, it is possible to suppress advance of abrasion degradation of the system main relays SMR-B, SMR-G, SMR-P.

When the current interruption circuit 60 is in the abnormal state, the system main relays SMR-B, SMR-P switch between the on state and the off state as shown in FIG. 19. Thus, it is possible to determine that the current interruption circuit 60 is in the abnormal state between time t12 and time t13 shown in FIG. 19.

In the present embodiment, as described with reference to FIG. 16 or FIG. 17, the current interruption circuit 60 interrupts energization of the exciting coils 51 of all the system main relays SMR-B, SMR-G, SMR-P; however, the invention is not limited to this configuration. As shown in FIG. 19, when drive control over the system main relays SMR-B, SMR-G, SMR-P is executed, the current interruption circuit 60 may interrupt energization of only the exciting coils 51 of the system main relays SMR-B, SMR-P. Here, energization of the exciting coil 51 of the system main relay SMR-G is not interrupted by the current interruption circuit 60.

In addition, the current interruption circuit 60 may interrupt energization of only the exciting coil 51 of the system main relay SMR-P. Here, energization of the exciting coil 51 of each of the system main relays SMR-B, SMR-G is not interrupted by the current interruption circuit 60. In this way, even with the configuration that the current interruption circuit 60 interrupts energization of only the exciting coils 51 of the system main relays SMR-B, SMR-P or interrupts energization of only the exciting coil 51 of the system main relay SMR-P, similar advantageous effects to those of the present embodiment are obtained. That is, without increasing the number of times each of the system main relays SMR-B, SMR-G, SMR-P is operated, it is possible to determine whether the current interruption circuit 60 is in the abnormal state.

A second embodiment of the invention will be described. In the present embodiment, like reference numerals denote the same components as those described in the first embodiment, and the detailed description is omitted. Hereinafter, the difference from the first embodiment will be mainly described.

In the first embodiment, by causing the alarm setting circuit 63 to determine that there is overcharging, the alarm signal is output, and the system main relays SMR-B, SMR-G, SMR-P are caused to switch from the on state to the off state. In the present embodiment, by causing the alarm setting circuit 63 to determine that there is overdischarging, the alarm signal is output, and the system main relays SMR-B, SMR-G, SMR-P are caused to switch from the on state to the off state.

Figure 22:
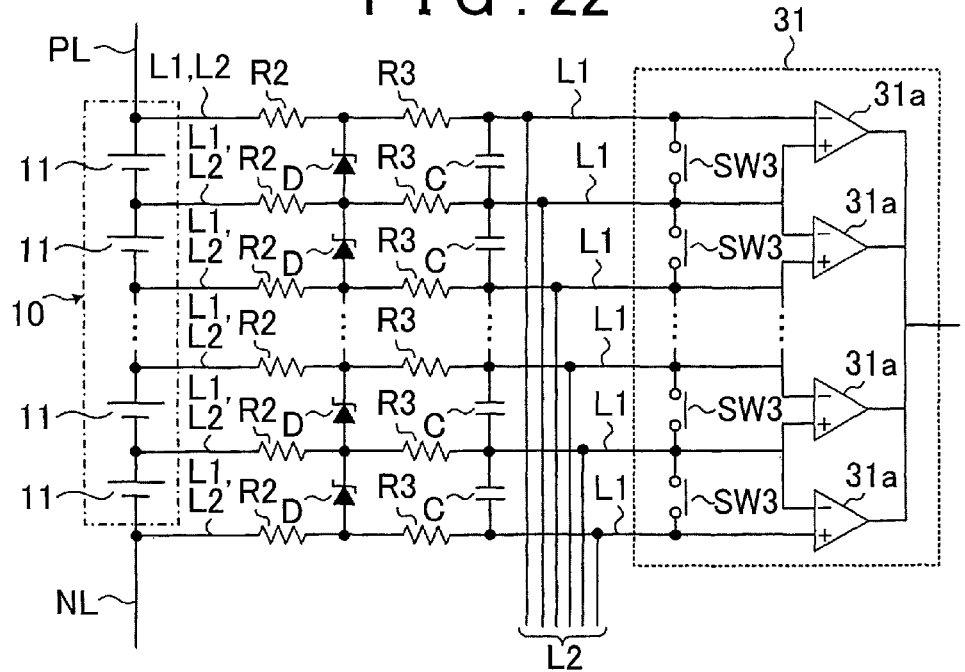
FIG. 22 is a view that shows the configuration of part of a battery ECU according to a second embodiment.

FIG. 22 is a view that shows the configuration of part of the battery ECU 30 according to the present embodiment. As shown in FIG. 22, part of each pair of voltage detection lines L1, L2 is shared, and the resistor R2, the Zener diode D and the capacitor C shown in FIG. 5 are connected to each voltage detection line L1. Here, as shown in FIG. 22, a branching portion of each pair of voltage detection lines L1, L2 is located between the corresponding capacitor C and the monitoring IC 31.

On the other hand, in the configuration shown in FIG. 22, a resistor R3 is provided in each pair of voltage detection lines L1, L2 in addition to the configuration shown in FIG. 5. Specifically, each resistor R3 is provided between a connection point of the diode D with the corresponding pair of voltage detection lines L1, L2 and a connection point of the corresponding capacitor C with the corresponding pair of voltage detection lines L1, L2.

The resistors R2, R3 are electrically connected in series with each other. The resistance value of each resistor R3 is larger than the resistance value of each resistor R2. Each resistor R3 is used to equalize the voltage values of the plurality of single cells 11. Equalizing the voltage values of the plurality of single cells 11 is termed equalizing process.

There may occur variations in self-discharge characteristics or variations in internal resistance among the plurality of single cells 11 that constitute the battery pack 10, and, due to the variations, there occur variations in voltage value among the plurality of single cells 11. When there are variations in voltage value among the plurality of single cells 11, it is not possible to efficiently charge or discharge all the single cells 11. Therefore, it is desirable to uniform the voltage values of the plurality of single cells 11. Here, when the equalizing process is executed, it is possible to suppress variations in voltage value among the plurality of single cells 11.

For example, when the voltage value of any one of the single cells 11 is higher than the voltage values of the other single cells 11, it is possible to discharge only the any one of the single cells 11 by executing the equalizing process. Here, it is possible to allow the discharging current of the any one of the single cells 11 to flow through the corresponding resistor R3. When only the any one of the single cells 11 is discharged, it is possible to equalize the voltage value of the any one of the single cells 11 to the voltage values of the other single cells 11.

The monitoring IC 31 includes a plurality of switches SW3. The number of the switches SW3 is equal to the number of the single cells 11. Each switch SW3 is connected to the corresponding two voltage detection lines L1 connected to the electrode terminals (positive electrode terminal and negative electrode terminal) of a corresponding one of the single cells 11. In addition, each switch SW3 is provided in a bypass circuit electrically connected in parallel with the corresponding capacitor C. Each switch SW3 switches between an on state and an off state upon reception of a control signal from the CPU 33 (see FIG. 1).

The switches SW3 are used to execute the above-described equalizing process. That is, when any one of the switches SW3 is turned on, it is possible to discharge only the single cell 11 corresponding to the any one of the switches SW3. Discharging current at this time flows through the resistors R2, R3 and the switch SW3. Thus, as described above, it is possible to suppress variations in voltage value among the plurality of single cells 11.

The monitoring IC 31 includes comparators 31a. Two input terminals of each comparator 31a are respectively connected to the positive electrode terminal and negative electrode terminal of the corresponding single cell 11 via the corresponding two voltage detection lines L1. Thus, each comparator 31a is able to detect the voltage value of the corresponding single cell 11. In the configuration shown in FIG. 22, when any one of the capacitors C is charged with electric charge in the corresponding single cell 11, the voltage value of the any one of the capacitors C becomes equal to the voltage value of the corresponding single cell 11. The corresponding comparator 31a detects the voltage value of the any one of the capacitors C. An output signal of the comparator 31a is input to the photocoupler 32 (see FIG. 1).

Figure 23:
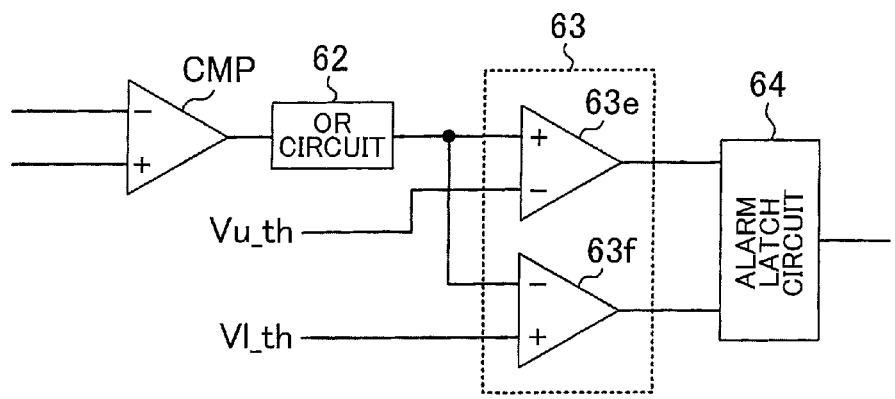
FIG. 23 is a view that shows the configuration of part of a current interruption circuit according to the second embodiment.

On the other hand, the alarm setting circuit 63 in the present embodiment may have the configuration shown in FIG. 23. As shown in FIG. 23, the alarm setting circuit 63 includes a first comparator 63e and a second comparator 63f. The first comparator 63e is used to determine whether any one of the single cells 11 is in the overcharged state. That is, the first comparator 63e is the same as the comparator 63a shown in FIG. 6 or FIG. 7 described in the first embodiment.

The output signal (the voltage value Vb of any one of the single cells 11) of the OR circuit 62 and a threshold Vu_th as a reference voltage are input to the first comparator 63e. The threshold Vu_th is a value for determining whether the single cell 11 is in the overcharged state, and is the same as the threshold V_th (see FIG. 6 or FIG. 7) described in the first embodiment. When the voltage value Vb of any one of the single cells 11 is higher than the threshold Vu_th, the first comparator 63e outputs the alarm signal indicating that the any one of the single cells 11 is in the overcharged state. On the other hand, when the voltage value Vb of any one of the single cells 11 is lower than or equal to the threshold Vu_th, the first comparator 63e does not output the alarm signal.

The second comparator 63f is used to determine whether the single cell 11 is in the overdischarged state. Here, the output signal (the voltage value Vb of any one of the single cells 11) of the OR circuit 62 and a threshold Vl_th as a reference voltage are input to the second comparator. 63f. The threshold Vl_th is a value for determining whether the single cell 11 is in the overdischarged state, and may be set as needed. When the voltage value Vb of any one of the single cells 11 is lower than the threshold Vl_th, the second comparator 63f outputs the alarm signal indicating that the any one of the single cells 11 is in the overdischarged state. On the other hand, when the voltage value Vb of any one of the single cells 11 is higher than or equal to the threshold Vl_th, the second comparator 63f does not output the alarm signal.

The alarm latch circuit 64 retains the alarm signal output from the first comparator 63e or the second comparator 63f. As described above, in the present embodiment, when any one of the single cells 11 is in the overcharged state or the overdischarged state, the alarm signal is output from the current interruption circuit 60. It is possible to cause the system main relays SMR-B, SMR-G, SMR-P to switch from the on state to the off state on the basis of the alarm signal.

In the configuration shown in FIG. 22, when any one of the switches SW3 is turned on in order to execute the equalizing process, the discharging current of the corresponding single cell 11 flows through the any one of the switches SW3, and is hard to flow through the corresponding capacitor C. Therefore, the voltage value of the corresponding capacitor C becomes lower than the voltage value of the corresponding single cell 11. Each comparator CMP of the current interruption circuit 60 detects the voltage value of the corresponding capacitor C as described with reference to FIG. 5. The voltage value output from each comparator CMP is lower than the voltage value of the corresponding single cell 11, so the voltage value output from each comparator CMP tends to be lower than the threshold Vl_th (see FIG. 23) that is compared in the alarm setting circuit 63.

When the voltage value output from any one of the comparators CMP is lower than the threshold Vl_th, the alarm signal is output from the alarm setting circuit 63 (comparator 63f) as described above. It is possible to stop the charging or discharging operation of the battery pack 10 by causing the system main relays SMR-B, SMR-G, SMR-P to switch from the on state to the off state on the basis of the alarm signal.

When any one of the single cells 11 has reached the overcharged state, the voltage value output from the corresponding comparator CMP becomes higher than the threshold Vu_th, and the alarm signal is output from the alarm setting circuit 63 (comparator 63e). It is possible to stop the charging or discharging operation of the battery pack 10 by causing the system main relays SMR-B, SMR-G, SMR-P to switch from the on state to the off state on the basis of the alarm signal.

Figure 24:
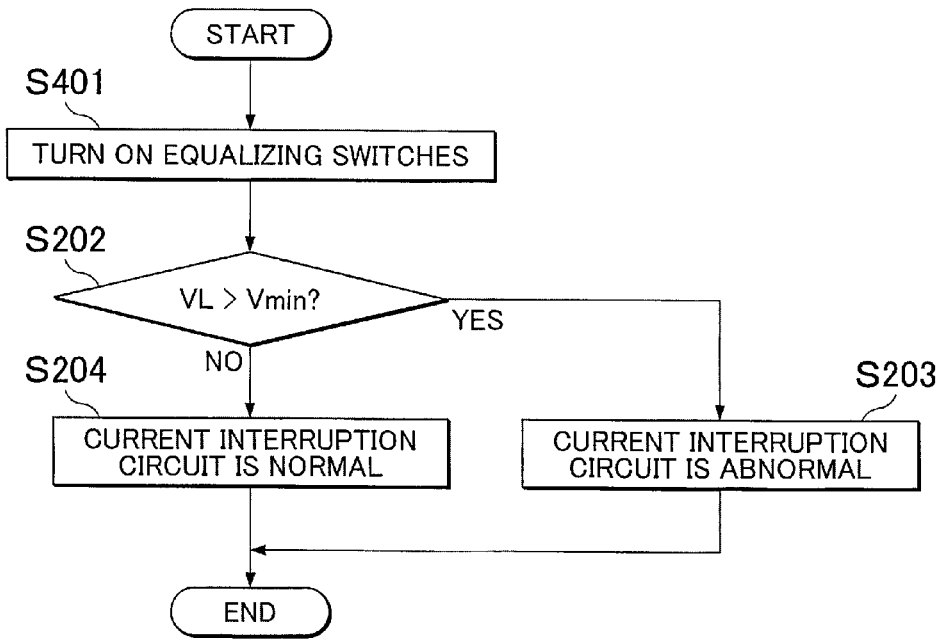
FIG. 24 is a flowchart that shows the process of determining whether the current interruption circuit is in the abnormal state according to the second embodiment.

Next, the process of determining whether the current interruption circuit 60 is in the abnormal state will be described with reference to the flowchart shown in FIG. 24. The process shown in FIG. 24 is executed by the battery ECU 30. Here, in the process shown in FIG. 24, like reference numerals denote the same processes as those described in FIG. 12, and the detailed description is omitted.

In the process shown in FIG. 24, the process of step S401 is executed instead of the process of step S201 shown in FIG. 12. In step S401, the battery ECU 30 causes the switches SW3, used in the equalizing process, to switch from the off state to the on state.

In the process of step S401, all the switches SW3 may be caused to switch from the off state to the on state. Thus, current is hard to flow through all the capacitors C shown in FIG. 22, so it is possible to set the voltage value of each capacitor C such that the voltage value of each capacitor C is lower than the voltage value of the corresponding single cell 11. Thus, the voltage values output from all the comparators CMP shown in FIG. 5 are lower than or equal to the threshold Vu_th, and the alarm signal is output from the alarm setting circuit 63 (comparator 63o).

When the alarm signal is output, the charging or discharging operation of the battery pack 10 is stopped, so it is possible to determine whether the current interruption circuit 60 is in the abnormal state by executing the process of step S202.

That is, when the voltage value VL detected by the voltage sensor 24 is lower than or equal to the threshold Vmin, the alarm signal is output from the alarm setting circuit 63, and the battery ECU 30 is allowed to determine that the current interruption circuit 60 is operating normally. In addition, when the voltage value VL is higher than the threshold Vmin, no alarm signal is output from the alarm setting circuit 63, and the battery ECU 30 is allowed to determine that the current interruption circuit 60 is in the abnormal state.

In the process of step S202 shown in FIG. 24, the voltage value VL of the voltage sensor 24 is compared with the threshold Vmin; however, the invention is not limited to this configuration. Specifically, as described with reference to FIG. 13, the current value detected by the current sensor 21 may be compared with the threshold Imin.

According to the present embodiment, even when each single cell 11 is not in the overdischarged state, it is possible to cause the current interruption circuit 60 to determine that any one of the single cells 11 is in the overdischarged state on the basis of the command output from the battery ECU 30. In other words, even when each single cell 11 is not in the overdischarged state, it is possible to cause the current interruption circuit 60 to output the alarm signal. Thus, it is possible to check whether the alarm signal is normally output from the current interruption circuit 60, and it is possible to determine whether the current interruption circuit 60 is in the abnormal state.

In the present embodiment as well, at the time of causing the battery system to enter the start-up state (ready-on state), it is possible to determine whether the current interruption circuit 60 is in the abnormal state. Here, when the process shown in FIG. 18 is executed, without increasing the number of times each of the system main relays SMR-B, SMR-G, SMR-P is caused to switch between the on state and the off state, it is possible to determine whether the current interruption circuit 60 is in the abnormal state or cause the battery system to enter the start-up state (ready-on state).

A battery system according to a third embodiment of the invention will be described. In the present embodiment, like reference numerals denote the same components to those described in the first or second embodiment, and the detailed description is omitted. Hereinafter, the difference from the first and second embodiments will be mainly described.

In the first embodiment, at the time of causing the battery system to enter the start-up state (ready-on state), it is determined whether the current interruption circuit 60 is in the abnormal state. On the other hand, in the present embodiment, at the time of causing the battery system to enter the stopped state (ready-off state), it is determined whether the current interruption circuit 60 is in the abnormal state. Here, it is possible to determine whether the current interruption circuit 60 is in the abnormal state both at the time of causing the battery system to enter the start-up state (ready-on state) and at the time of causing the battery system to enter the stopped state (ready-off state).

Figure 25:
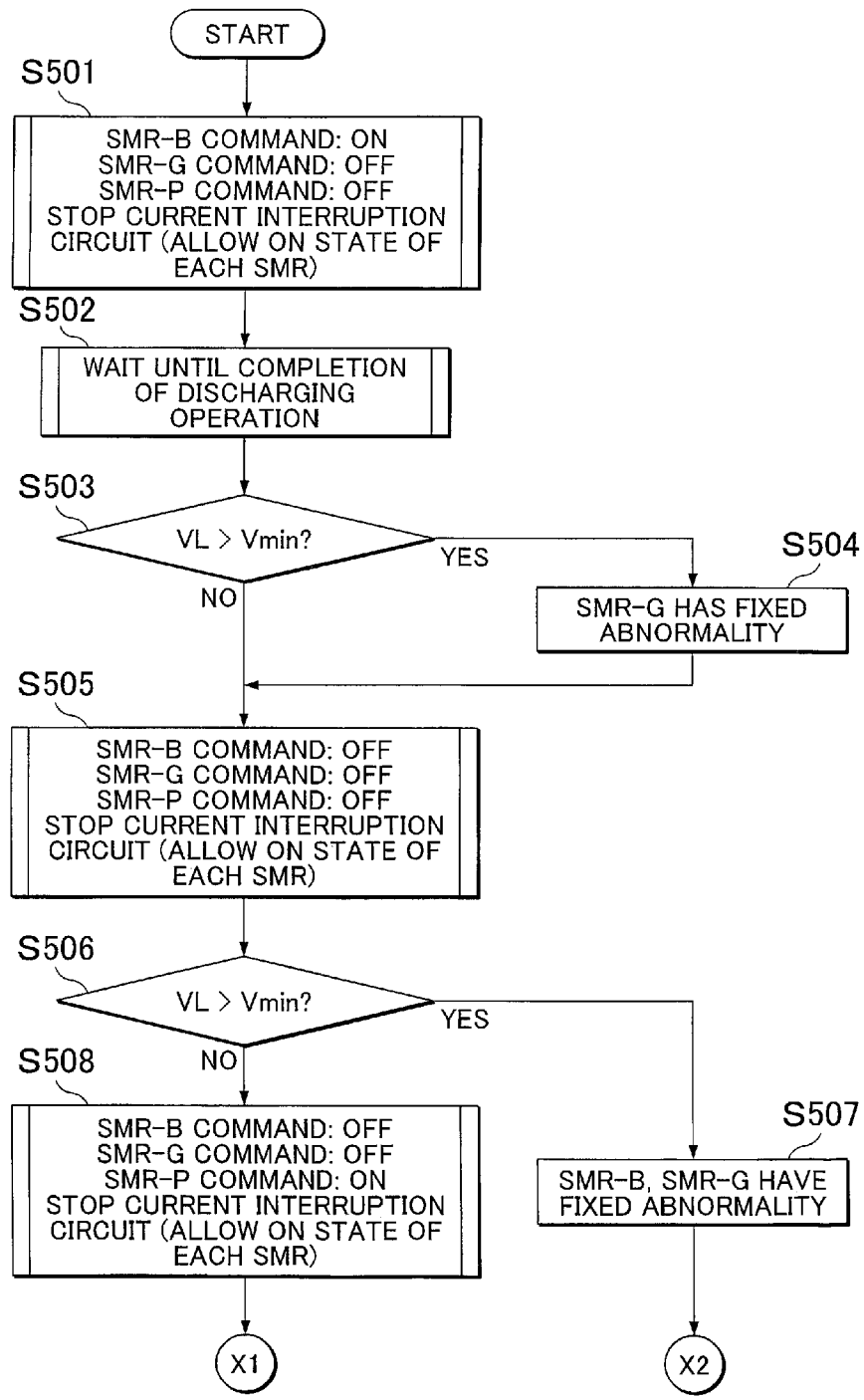
FIG. 25 is a flowchart that shows a process executed at the time of causing a battery system to enter a stopped state (ready-off state)
Figure 26:
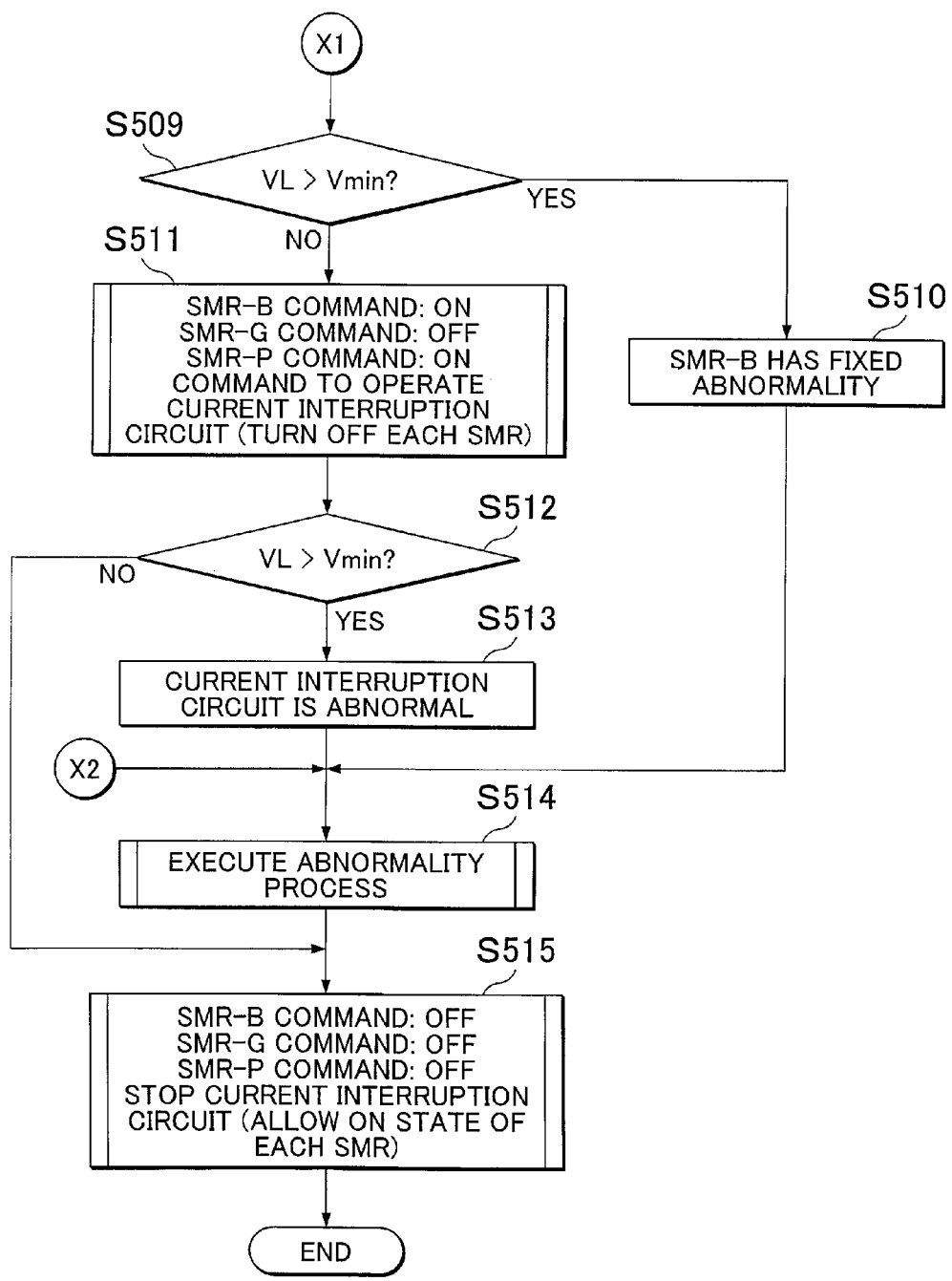
FIG. 26 is a flowchart that shows a process executed at the time of causing the battery system to enter the stopped state (ready-off state)

FIG. 25 and FIG. 26 show a flowchart that shows a process at the time of causing the battery system to enter the stopped state (ready-off state) according to the present embodiment. The process shown in FIG. 25 and FIG. 26 is executed by the host ECU 34. In addition, the process shown in FIG. 25 and FIG. 26 is started at the time when the ignition switch switches from the on state to the off state. Before the process shown in FIG. 25 and FIG. 26 is started, the battery system is in the start-up state (ready-on state), and the system main relays SMR-B, SMR-G are in the on state.

In step S501, the host ECU 34 (SMR drive circuit 34b) executes the process of causing the system main relay SMR-G to switch from the on state to the off state upon reception of information about the off state of the ignition switch. Specifically, the SMR drive circuit 34b interrupts energization of the exciting coil 51 of the system main relay SMR-G. By causing the system main relay SMR-G to switch from the on state to the off state, connection of the battery pack 10 with the load (inverter 22) is interrupted, and the charging or discharging operation of the battery pack 10 is stopped.

In step S502, the host ECU 34 waits until the discharging operation of the capacitor 25 (see FIG. 1) is completed. For example, initially, a period of time up to completion of the discharging operation of the capacitor 25 (termed discharge completion time) is obtained in advance. The host ECU 34 measures a period of time from execution of the process of step S501 with the use of a timer, and is able to determine that the discharging operation of the capacitor 25 has been completed when the measured period of time has reached the discharge completion time. When connection of the battery pack 10 with the load (inverter 22) is interrupted, electric charge stored in the capacitor 25 is released. Accordingly, the voltage value VL detected by the voltage sensor 24 starts decreasing.

In step S503, the host ECU 34 detects the voltage value VL, input to the inverter 22, with the use of the voltage sensor 24. The host ECU 34 determines whether the voltage value VL is higher than the threshold (voltage value) Vmin. The threshold Vmin is the same as the threshold Vmin described in the process of step S302 shown in FIG. 18.

When the voltage value VL is higher than the threshold Vmin, the host ECU 34 executes the process of step S504. On the other hand, when the voltage value VL is lower than or equal to the threshold Vmin, the host ECU 34 executes the process of step S505. When connection of the battery pack 10 with the load (inverter 22) is interrupted, the voltage value VL decreases and becomes lower than or equal to the threshold Vmin as described above.

Here, when the voltage value VL is higher than the threshold Vmin irrespective of execution of the process of causing the system main relay SMR-G to switch from the on state to the off state, it may be determined that the battery pack 10 is connected to the load (inverter 22). In other words, it may be determined that the system main relay SMR-G is fixed in the on state.

Therefore, when the process proceeds from step S503 to step S504, the host ECU 34 determines that the system main relay SMR-G is in a fixed state. After the process of step S504 is executed, the host ECU 34 executes the process of step S505. On the other hand, when the voltage value VL is lower than or equal to the threshold Vmin, the host ECU 34 is allowed to determine that the system main relay SMR-G is not fixed in the on state and is in the normal state.

In step S505, the host ECU 34 executes the process of causing the system main relay SMR-B to switch from the on state to the off state. Specifically, the SMR drive circuit 34b interrupts energization of the exciting coil 51 of the system main relay SMR-B.

In step S506, the host ECU 34 detects the voltage value VL, input to the inverter 22, with the use of the voltage sensor 24. The host ECU 34 determines whether the voltage value VL is higher than the threshold (voltage value) Vmin. The threshold Vmin is the same as the threshold Vmin described in the process of step S503. When the voltage value VL is higher than the threshold Vmin, the host ECU 34 executes the process of step S507. On the other hand, when the voltage value VL is lower than or equal to the threshold Vmin, the host ECU 34 executes the process of step S508. When connection of the battery pack 10 with the load (inverter 22) is interrupted, the voltage value VL decreases and becomes lower than or equal to the threshold Vmin as described above.

When the system main relay SMR-B switches from the on state to the off state through the process of step S505, it is possible to interrupt connection of the battery pack 10 with the load (inverter 22), and it is possible to decrease the voltage value VL. On the other hand, when the voltage value VL is higher than the threshold Vmin even when the process of causing the system main relay SMR-B to switch from the on state to the off state is executed, it may be determined that the battery pack 10 is connected to the load (inverter 22).

Here, in the process of step S504, it is determined that the system main relay SMR-G is in the fixed state. In this state, when the voltage value VL is higher than the threshold Vmin even when the process of causing the system main relay SMR-B to switch from the on state to the off state is executed, the system main relay SMR-B is fixed in the on state. Thus, the host ECU 34 is allowed to determine that the system main relay SMR-B is in the abnormal state.

When the system main relay SMR-B is allowed to normally switch from the on state to the off state even when the system main relay SMR-G is fixed in the on state, it is possible to interrupt connection of the battery pack 10 with the load (inverter 22). In other words, it is possible to set the voltage value VL such that the voltage value VL is lower than or equal to the threshold Vmin. Even when the process of causing the system main relay SMR-B to switch from the on state to the off state is executed at the time when the system main relay SMR-G is fixed in the on state, but when the voltage value VL is higher than the threshold Vmin, it may be determined that the system main relays SMR-G, SMR-B are fixed and are in the abnormal state.

In the process of step S507, as described above, the host ECU 34 determines that the system main relays SMR-G, SMR-B are in the fixed state. After the process of step S507 is executed, the host ECU 34 executes the process of step S514. In addition, in the process of step S504, when it is determined that the system main relay SMR-G is in the fixed state as well, the host ECU 34 executes the process of step S514.

In step S508, the host ECU 34 executes the process of causing the system main relay SMR-P to switch from the off state to the on state. Specifically, the SMR drive circuit 34b starts energization of the exciting coil 51 of the system main relay SMR-P. Thus, the system main relay SMR-P switches from the off state to the on state.

In step S509, the host ECU 34 detects the voltage value VL, input to the inverter 22, with the use of the voltage sensor 24. The battery ECU 30 determines whether the voltage value VL is higher than the threshold (voltage value) Vmin. The threshold Vmin is the same as the threshold Vmin described in the process of step S503.

When the voltage value VL is higher than the threshold Vmin after the system main relay SMR-P is caused to switch from the off state to the on state through the process of step S508, the host ECU 34 is allowed to determine that the system main relay SMR-B is fixed in the on state. That is, when not only the system main relay SMR-P but also the system main relay SMR-B is in the on state, the battery pack 10 is connected to the load (inverter 22), and the voltage value VL is higher than the threshold Vmin.

When the voltage value VL is higher than the threshold Vmin, the host ECU 34 determines in step S510 that the system main relay SMR-B is fixed and is in the abnormal state. After the process of step S510 is executed, the host ECU 34 executes the process of step S514. On the other hand, in the process of step S509, when the voltage value VL is lower than or equal to the threshold Vmin, the host ECU 34 executes the process of step S511.

In step S511, the host ECU 34 executes the process of causing the system main relay SMR-B to switch from the off state to the on state. Specifically, the SMR drive circuit 34b causes current to flow through the exciting coil 51 of the system main relay SMR-B. In addition, in step S511, the host ECU 34 executes the process of causing the current interruption circuit 60 to output the alarm signal.

Here, when the current interruption circuit 60 is in the normal state, the system main relay SMR-B remains in the off state in response to the output of the alarm signal. That is, even when the SMR drive circuit 34b attempts to cause current to flow through the exciting coil 51 of the system main relay SMR-B, no current flows through the exciting coil 51. In addition, the system main relay SMR-P switches from the on state to the off state in response to the output of the alarm signal. That is, even when the SMR drive circuit 34*b* is causing current to flow through the exciting coil 51 of the system main relay SMR-P, energization of the exciting coil 51 is interrupted by the current interruption circuit 60.

On the other hand, when the current interruption circuit 60 is in the abnormal state, no alarm signal is output. Therefore, the system main relay SMR-B switches from the off state to the on state through the process of step S511. On the other hand, the system main relay SMR-P remains in the on state.

In step S512, the host ECU 34 detects the voltage value VL, input to the inverter 22, with the use of the voltage sensor 24. The battery ECU 30 determines whether the voltage value VL is higher than the threshold (voltage value) Vmin. The threshold Vmin is the same as the threshold Vmin described in the process of step S503.

When the voltage value VL is higher than the threshold Vmin, the host ECU 34 executes the process of step S513. As described above, when the current interruption circuit 60 is in the abnormal state, the system main relays SMR-B, SMR-P are turned on, so the voltage value VL becomes higher than the threshold Vmin. On the other hand, when the voltage value VL is lower than or equal to the threshold Vmin, the host ECU 34 executes the process of step S515. As described above, when the current interruption circuit 60 is in the normal state, the system main relays SMR-B, SMR-P are turned off, so the voltage value VL becomes lower than or equal to the threshold Vmin.

In step S513, the host ECU 34 determines that the current interruption circuit 60 is in the abnormal state. After the process of step S513 is executed, the host ECU 34 executes the process of step S514. The process of step S513 is similar to the process of step S303 shown in FIG. 18. When the process proceeds from step S512 to step S515, the host ECU 34 is allowed to determine that the current interruption circuit 60 is in the normal state.

In step S514, the host ECU 34 alarms that the battery system has an abnormality. The abnormality here includes the abnormal state of the system main relay SMR-G, determined in the process of step S504, the abnormal state of the system main relays SMR-B, SMR-G, determined in the process of step S507, the abnormal state of the system main relay SMR-B, determined in the process of step S510, and the abnormal state of the current interruption circuit 60, determined in the process of step S513.

Here, when the battery system has an abnormality, the host ECU 34 is allowed to cause the battery system to enter the stopped state (ready-off state). The process of step S514 is similar to the process of step S307 shown in FIG. 18.

In step S515, the host ECU 34 executes the process of causing the system main relays SMR-B, SMR-P to switch from the on state to the off state. Specifically, the SMR drive circuit 34*b* interrupts energization of the exciting coil 51 of each of the system main relays SMR-B, SMR-P. In addition, in step S515, the host ECU 34 stops the process of causing the current interruption circuit 60 to output the alarm signal.

When the output of the alarm signal is stopped, the system main relays SMR-B, SMR-P switch from the on state to the off state in response to the operation of the SMR drive circuit 34*b*. That is, when the current interruption circuit 60 is in the normal state, the system main relay SMR-P switches from the on state to the off state. When the current interruption circuit 60 is in the normal state, the system main relay SMR-B remains in the off state as described above. By executing the process of step S515, it is possible to cause the battery system to enter the stopped state (ready-off state).

Figure 27:
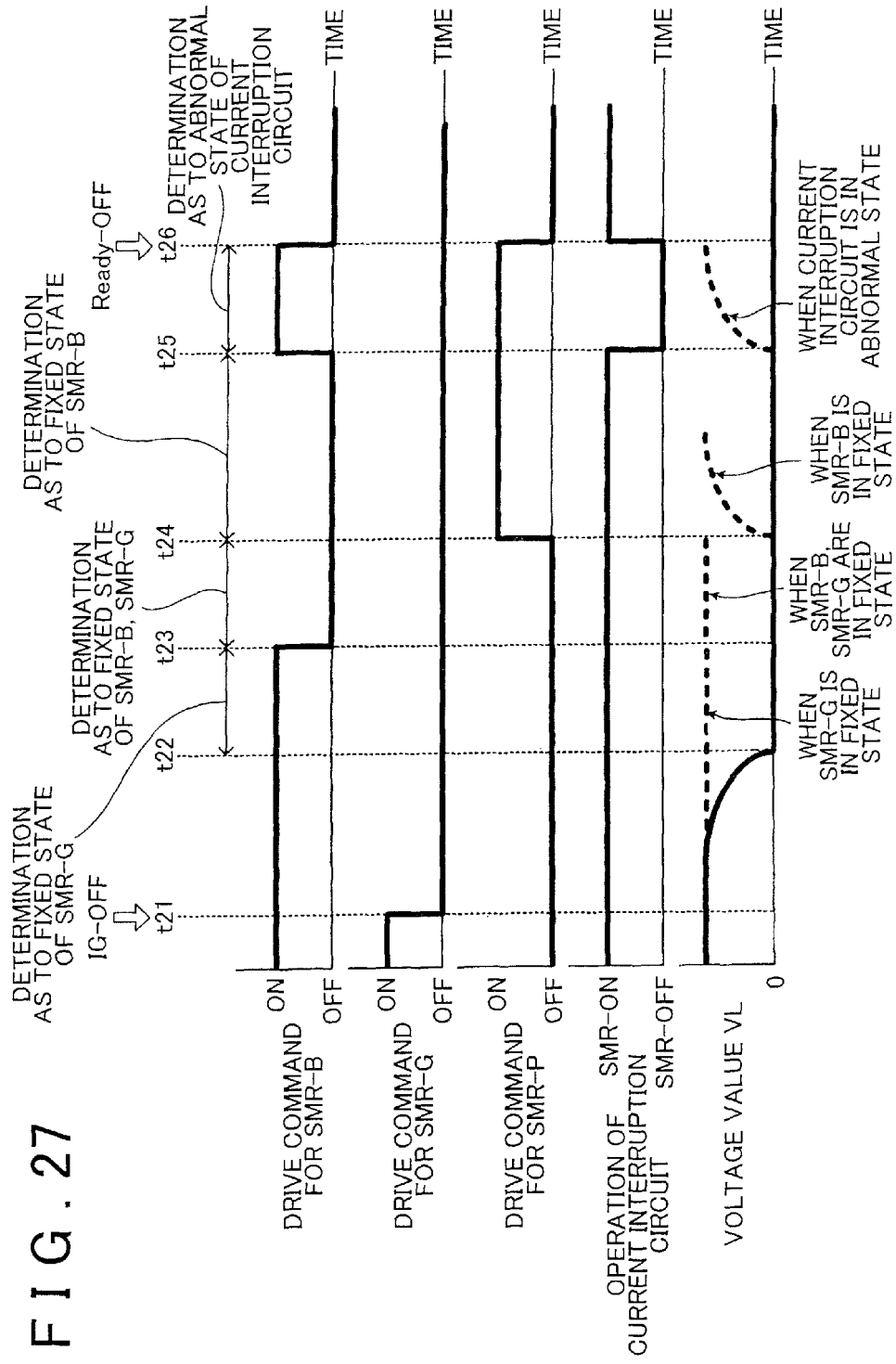
FIG. 27 is a timing chart that shows drive commands for the system main relays and the operation of the current interruption circuit at the time of causing the battery system to enter the stopped state (ready-off state)

FIG. 27 shows the drive commands for the system main relays SMR-B, SMR-G, SMR-P and the operation of the current interruption circuit 60 at the time when the process shown in FIG. 25 and FIG. 26 is executed. Here, the drive commands for the SMR-B, SMR-G, SMR-P shown in FIG. 27 indicate the operation of the SMR drive circuit 34*b*, and do not indicate actual operations of the system main relays SMR-B, SMR-G, SMR-P.

As described in the process of step S501, when the information about the off state of the ignition switch is input to the host ECU 34, the process of causing the system main relay SMR-G to switch from the on state to the off state is executed at time t21. Thus, after time t21, the discharging operation of the capacitor 25 is started, and the voltage value VL starts decreasing. Between time t21 and time t22, the process of step S502 shown in FIG. 25 is executed.

When the discharging operation of the capacitor 25 is completed, it is determined whether the system main relay SMR-G is fixed in the on state between time t22 and time t23. That is, between time t22 and time t23, the process of step S503 shown in FIG. 25 is executed. When the system main relay SMR-G is fixed in the on state, the voltage value VL remains increased even after time t22 as indicated by the dashed line in FIG. 27. By monitoring the behavior of the voltage value VL, it is possible to determine whether the system main relay SMR-G is fixed.

At time t23, the process of step S505 shown in FIG. 25 is executed. That is, the process of causing the system main relay SMR-B to switch from the on state to the off state is executed. After time t23, the process of turning off the system main relays SMR-G, SMR-B is executed, and, when the system main relays SMR-G, SMR-B are fixed in the on state, the voltage value VL remains increased as indicated by the dashed line in FIG. 27. By monitoring the behavior of the voltage value VL, it is possible to determine whether the system main relays SMR-G, SMR-B are fixed.

At time t24, the process of step S508 shown in FIG. 25 is executed. After time t24, only the system main relay SMR-P turns on; however, when the system main relay SMR-B is fixed in the on state, the voltage value VL increases as indicated by the dashed line in FIG. 27. By monitoring the behavior of the voltage value VL, it is possible to determine whether the system main relay SMR-B is fixed. Between time t24 and time t25, the process of step S509 shown in FIG. 26 is executed.

At time t25, the process of step S511 shown in FIG. 26 is executed. That is, the process of causing the system main relay SMR-B to switch from the off state to the on state is executed, and the process of causing the current interruption circuit 60 to output the alarm signal is executed. When the current interruption circuit 60 is in the abnormal state, the system main relays SMR-B, SMR-P turn on, so the battery pack 10 is connected to the load (inverter 22). Accordingly, as indicated by the dashed line in FIG. 27, the voltage value VL increases after time t25. By monitoring the behavior of the voltage value VL, it is possible to determine whether the current interruption circuit 60 is in the abnormal state.

On the other hand, when the current interruption circuit 60 is in the normal state, the system main relay SMR-B remains in the off state, and the system main relay SMR-P switches from the on state to the off state. Therefore, the battery pack 10 is not connected to the load (inverter 22), and the voltage value VL does not increase. Between time t25 and time t26, the process of step S512 shown in FIG. 26 is executed.

In the present embodiment, the process of causing the system main relay SMR-B to switch from the off state to the on state and the process of outputting the alarm signal are executed at the same time t25; however, the invention is not limited to this configuration. Specifically, it is possible to execute the process of causing the system main relay SMR-B to switch from the off state to the on state after the process of outputting the alarm signal is executed.

At time t26, the process of step S515 shown in FIG. 26 is executed. That is, the process of causing the system main relays SMR-B, SMR-P to switch from the on state to the off state is executed, and the process of stopping outputting the alarm signal is executed. At time t26, the system main relays SMR-B, SMR-G, SMR-P are in the off state, and the battery system enters the stopped state (ready-off state).

In the present embodiment, the process of causing the system main relays SMR-B, SMR-P to switch from the on state to the off state and the process of stopping outputting the alarm signal are executed at the same time t26; however, the invention is not limited to this configuration. Specifically, it is possible to execute the process of causing the system main relays SMR-B, SMR-P to switch from the on state to the off state before the process of stopping outputting the alarm signal is executed.

In the present embodiment, the process of causing the system main relay SMR-B to switch from the on state to the off state and the process of causing the system main relay SMR-P to switch from the on state to the off state are executed at the same time t26; however, the invention is not limited to this configuration. Specifically, the process of causing the system main relay SMR-B to switch from the on state to the off state and the process of causing the system main relay SMR-P to switch from the on state to the off state may be executed at mutually different times. However, it is required to execute the process of causing the system main relays SMR-B, SMR-P to switch from the on state to the off state before the process of stopping outputting the alarm signal is executed.

Figure 28:
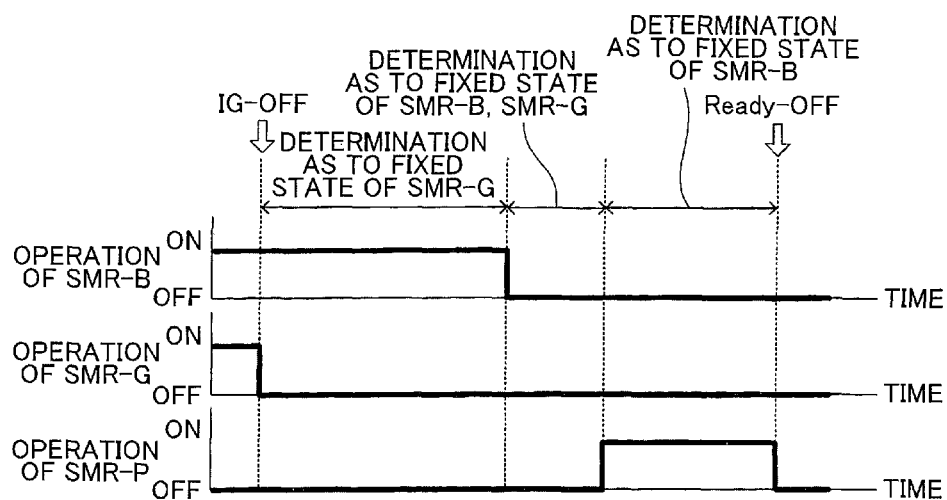
FIG. 28 is a timing chart that shows the operations of the system main relays at the time of causing the battery system to enter the stopped state (ready-off state) in the case where it is not determined whether the current interruption circuit is in the abnormal state.

When it is not determined whether the current interruption circuit 60 is in the abnormal state, the system main relays SMR-B, SMR-G, SMR-P may be operated as shown in FIG. 28. Here, the "operations of the SMR-B, SMR-G, SMR-P" shown in FIG. 28 indicate actual operations of the system main relays SMR-B, SMR-G, SMR-P.

As shown in FIG. 28, when the system main relays SMR-B, SMR-G, SMR-P are operated, it is possible to determine whether the system main relays SMR-G, SMR-B are in the fixed state or cause the battery system to enter the stopped state (ready-off state) as in the case of the example described with reference to FIG. 27.

Figure 29:
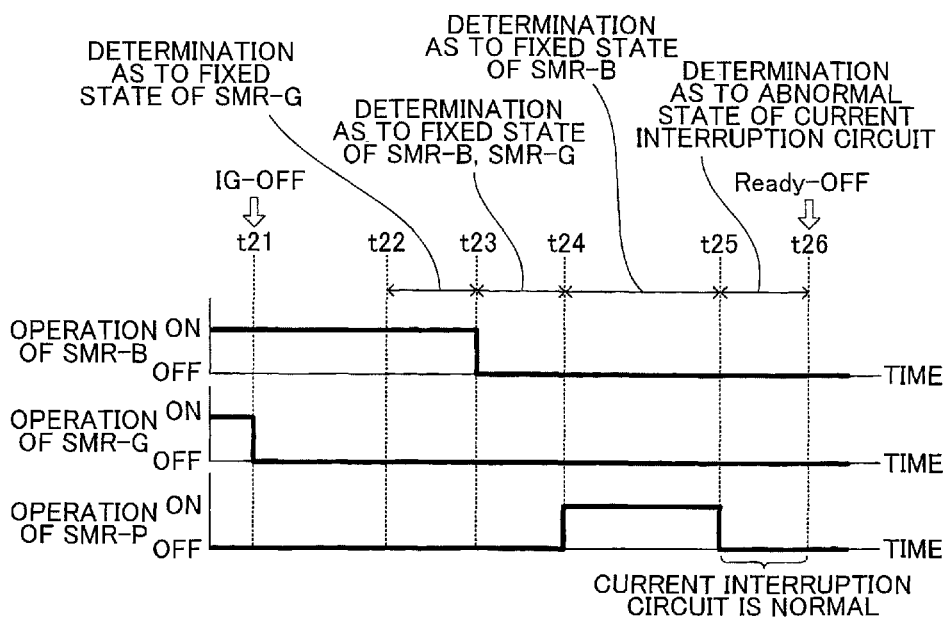
FIG. 29 is a timing chart that shows the operations of the system main relays at the time of causing the battery system to enter the stopped state (ready-off state) in the case where it is determined whether the current interruption circuit is in the abnormal state.

On the other hand, as described in the present embodiment, when it is determined whether the current interruption circuit 60 is in the abnormal state as the time of causing the battery system to enter the stopped state (ready-off state), the system main relays SMR-B, SMR-G, SMR-P operate as shown in FIG. 29. FIG. 29 is a view corresponding to FIG. 27. Here, the "operations of the SMR-B, SMR-G, SMR-P" shown in FIG. 29 indicate actual operations of the system main relays SMR-B, SMR-G, SMR-P. In addition, in FIG. 29, it is assumed that the current interruption circuit 60 is in the normal state.

As is apparent from comparison between FIG. 28 and FIG. 29, the number of times each of the system main relays SMR-B, SMR-G, SMR-P is operated is equal between when it is not determined whether the current interruption circuit 60 is in the abnormal state (FIG. 28) and when it is determined whether the current interruption circuit 60 is in the abnormal state (FIG. 29). That is, by executing the process shown in FIG. 25 and FIG. 26, the number of times each of the system main relays SMR-B, SMR-G, SMR-P is operated does not increase in order to determine whether the current interruption circuit 60 is in the abnormal state. Thus, it is possible to suppress advance of abrasion degradation of the system main relays SMR-B, SMR-G, SMR-P.

When the current interruption circuit 60 is in the abnormal state, the system main relays SMR-B, SMR-P switch between the on state and the off state as shown in FIG. 27. Thus, it is possible to determine that the current interruption circuit 60 is in the abnormal state between time t25 and time t26 shown in FIG. 27.

As shown in FIG. 27, when drive control over the system main relays SMR-B, SMR-G, SMR-P is executed, the current interruption circuit 60 may interrupt energization of only the exciting coils 51 of the system main relays SMR-B, SMR-P. Here, energization of the exciting coil 51 of the system main relay SMR-G is not interrupted by the current interruption circuit 60. In addition, the current interruption circuit 60 may interrupt energization of only the exciting coil 51 of the system main relay SMR-P. Here, energization of the exciting coil 51 of each of the system main relays SMR-B, SMR-G is not interrupted by the current interruption circuit 60.

In this way, even with the configuration that the current interruption circuit 60 interrupts energization of only the exciting coils 51 of the system main relays SMR-B, SMR-P or interrupts energization of only the exciting coil 51 of the system main relay SMR-P, similar advantageous effects to those of the present embodiment are obtained. That is, without increasing the number of times each of the system main relays SMR-B, SMR-G, SMR-P is operated, it is possible to determine whether the current interruption circuit 60 is in the abnormal state.

In the above-described first to third embodiments, the battery pack 10 is connected to the load (inverter 22) or connection of the battery pack 10 with the load is interrupted with the use of the three system main relays SMR-B, SMR-G, SMR-P; however, the invention is not limited to this configuration. For example, the system main relay SMR-P may be omitted, and the two system main relays SMR-B, SMR-G may be used. In addition, one of the two system main relays SMR-B, SMR-G may be omitted.

The invention claimed is:

1. An electrical storage system comprising:
   an electrical storage device in which a plurality of electrical storage blocks are connected in series with each other, each of the plurality of electrical storage blocks including at least one electrical storage element which is charged or discharged;
   a relay configured to switch between an on state where the electrical storage device is connected to a load and an off state where connection of the electrical storage device with the load is interrupted;
   a controller configured to control an on-off state of the relay; and
   a current interruption circuit configured to interrupt energization of the electrical storage device by causing the relay to switch from the on state to the off state,
   the current interruption circuit including:
      an alarm circuit configured to output an alarm signal indicating that any one of the electrical storage blocks is in an overcharged state or an overdischarged state by comparing an input voltage value of each electrical storage block with a threshold;
      a latch circuit configured to retain the alarm signal; and
      a transistor configured to cause the relay to switch from the on state to the off state upon reception of an output signal of the latch circuit, and wherein the controller is further configured to execute control for causing the relay to switch into the on state and determine an energization state of the electrical storage device while control for causing the alarm circuit to output the alarm signal is being executed by changing one of the voltage value and the threshold, input to the alarm circuit.

2. The electrical storage system according to claim 1, wherein
the controller is configured to determine that the current interruption circuit is in an abnormal state when the electrical storage device becomes an energized state as a result of control for causing the relay to switch into the on state while control for causing the alarm circuit to output the alarm signal is being executed.

3. The electrical storage system according to claim 1, wherein
the controller is configured to determine that the current interruption circuit is in a normal state when the electrical storage device is in a non-energized state while control for causing the alarm circuit to output the alarm signal is being executed.

4. The electrical storage system according to claim 1, wherein
the controller is configured to determine the energization state of the electrical storage device using an output of one of a voltage sensor configured to detect a voltage value of the electrical storage device and a current sensor configured to detect a current value of the electrical storage device.

5. The electrical storage system according to claim 1, wherein
the controller is configured to keep the relay in the on state after control for causing the alarm circuit to output the alarm signal is ended.

6. The electrical storage system according to claim 1, wherein
the controller is configured to cause the relay to switch from the on state to the off state while control for causing the alarm circuit to output the alarm signal is being executed.

7. The electrical storage system according to claim 1, characterized in that
the relay includes
a first relay and a second relay respectively provided in a positive electrode line and a negative electrode line that connect the electrical storage device to the load; and
a third relay connected in parallel with the second relay in a state where the third relay is connected in series with a resistor, and the controller is configured to execute control for causing the first relay and the third relay to turn on while control for causing the alarm circuit to output the alarm signal is being executed.

8. The electrical storage system according to claim 7, wherein
the controller is configured to, in a state where the first relay is kept in the on state, execute a first process in which control for causing the third relay to switch from the on state to the off state is executed while control for causing the alarm circuit to output the alarm signal is being executed, a second process in which the third relay is caused to switch from the off state to the on state after control for causing the alarm circuit to output the alarm signal is executed, and a third process in which, after the second process, the third relay is caused to switch from the on state to the off state and the second relay is caused to switch from the off state to the on state.

9. The electrical storage system according to claim 8, wherein
the controller is configured to determine whether the third relay is in a fixed state on the basis of determination as to the energization state of the electrical storage device when control for causing the third relay to switch into the off state is executed after control for causing the alarm circuit to output the alarm signal is executed.

10. The electrical storage system according to claim 7, wherein
the controller is configured to execute control for causing the first relay and the third relay to switch from the on state to the off state while control for causing the alarm circuit to output the alarm signal is being executed.

11. The electrical storage system according to claim 10, wherein
the controller is configured to determine whether the first relay and the second relay are in a fixed state on the basis of determination as to the energization state of the electrical storage device by causing the first relay and the second relay to switch from the on state to the off state at mutually different timings before control for causing the alarm circuit to output the alarm signal is executed.

12. The electrical storage system according to claim 11, wherein
the controller is configured to determine the first relay is in a fixed state on the basis of determination as to the energization state of the electrical storage device by causing the third relay to switch from the off state to the on state after the first relay and the second relay are caused to switch into the off state.

* * * * *